US010621784B2

(12) United States Patent
Khan et al.

(10) Patent No.: US 10,621,784 B2
(45) Date of Patent: Apr. 14, 2020

(54) VENUE MAPPING FOR VIRTUAL REALITY SPECTATING OF LIVE EVENTS

(71) Applicant: Sony Interactive Entertainment America LLC, San Mateo, CA (US)

(72) Inventors: Mohammed Khan, San Mateo, CA (US); Bhaswar Sarkar, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 15/721,656

(22) Filed: Sep. 29, 2017

(65) Prior Publication Data
US 2019/0102941 A1 Apr. 4, 2019

(51) Int. Cl.
*G06T 19/00* (2011.01)
*G02B 27/01* (2006.01)
*H04N 13/117* (2018.01)
*H04N 13/243* (2018.01)
*H04N 13/366* (2018.01)
(Continued)

(52) U.S. Cl.
CPC ............ *G06T 19/006* (2013.01); *A63F 13/26* (2014.09); *A63F 13/5252* (2014.09); *A63F 13/86* (2014.09); *G02B 27/017* (2013.01); *G06T 19/003* (2013.01); *H04N 13/117* (2018.05); *H04N 13/194* (2018.05); *H04N 13/243* (2018.05); *H04N 13/344* (2018.05);
(Continued)

(58) Field of Classification Search
CPC ....... G06T 19/006; G06T 19/003; A63F 13/86
See application file for complete search history.

(56) References Cited

U.S. PATENT DOCUMENTS 9,616,338 B1 4/2017 Hooper et al.
10,078,917 B1 * 9/2018 Gaeta .................... G06T 19/006
(Continued)

FOREIGN PATENT DOCUMENTS

EP 1117074 A2 7/2001
WO 2017161281 A1 9/2017

OTHER PUBLICATIONS

Weissig, Christian, et al. "The ultimate immersive experience: panoramic 3d video acquisition." International Conference on Multimedia Modeling. Springer, Berlin, Heidelberg, 2012. (Year: 2012).*

(Continued)

*Primary Examiner* — Yu Chen
(74) *Attorney, Agent, or Firm* — Penilla IP, APC

(57) ABSTRACT

In some implementations, a method is provided, including the following operations: receiving, over a network from a client device, a request to spectate a live event through a head-mounted display by a virtual reality spectator; assigning the virtual reality spectator to a seat in a venue in which the live event takes place; receiving a plurality of video feeds from a plurality of cameras positioned in the venue; accessing video processing parameters that are stored in association with the seat; using the video processing parameters to select and stitch selected ones of the video feeds to generate a composite video that provides a view of the venue from a perspective that is substantially defined by a 3D location of the seat in the venue; transmitting the composite video over the network to the client device for rendering to the head-mounted display.

21 Claims, 16 Drawing Sheets

(51) Int. Cl.
    *H04N 13/344* (2018.01)
    *A63F 13/5252* (2014.01)
    *H04N 13/194* (2018.01)
    *A63F 13/26* (2014.01)
    *A63F 13/86* (2014.01)

(52) U.S. Cl.
    CPC ..... *H04N 13/366* (2018.05); *G02B 2027/014* (2013.01); *G02B 2027/0138* (2013.01)

(56) References Cited

U.S. PATENT DOCUMENTS

| | | | | |
|---|---|---|---|---|
| 10,277,813 | B1* | 4/2019 | Thomas | H04N 5/23238 |
| 2009/0042646 | A1* | 2/2009 | Sarkar | H04L 67/145 |
| | | | | 463/29 |
| 2010/0251173 | A1* | 9/2010 | Imanishi | H04N 7/17318 |
| | | | | 715/810 |
| 2012/0323612 | A1* | 12/2012 | Callaghan | G06Q 10/02 |
| | | | | 705/5 |
| 2013/0083173 | A1* | 4/2013 | Geisner | G06F 3/013 |
| | | | | 348/51 |
| 2013/0141523 | A1* | 6/2013 | Banta | H04N 5/23238 |
| | | | | 348/36 |
| 2013/0310122 | A1* | 11/2013 | Piccionielli | G07F 17/3272 |
| | | | | 463/2 |
| 2014/0013228 | A1* | 1/2014 | Hutten | G06F 3/048 |
| | | | | 715/720 |
| 2016/0125324 | A1* | 5/2016 | Yamamoto | G06Q 30/02 |
| | | | | 705/5 |
| 2017/0157512 | A1* | 6/2017 | Long | A63F 13/497 |
| 2017/0354875 | A1* | 12/2017 | Marks | A63F 13/213 |
| 2018/0108172 | A1* | 4/2018 | Huston | G06T 15/205 |
| 2018/0167656 | A1* | 6/2018 | Ortiz | G07F 17/32 |
| 2018/0324410 | A1* | 11/2018 | Roine | G06T 3/4038 |
| 2018/0330188 | A1* | 11/2018 | Rakshit | G06T 11/60 |

OTHER PUBLICATIONS

PCT International Search Report and Written Opinion of the International Searching Authority issued in corresponding International Patent Application No. PCT/US2018/052744 dated Dec. 6, 2018 (PCT Forms ISA 220, 210, 237) (11 total pages).

* cited by examiner

VENUE MAPPING FOR VIRTUAL REALITY SPECTATING OF LIVE EVENTS

BACKGROUND

1. Field of the Disclosure

The present disclosure relates to venue mapping for virtual reality spectating of electronic sports.

2. Description of the Related Art

Electronic sports (e-sports) generally refers to a form of sports where the primary aspects of the sport are facilitated by electronic systems, wherein the input of players and teams as well as the output of the e-sports system are mediated by human-computer interfaces. (See, e.g., Juho Hamari, Max Sjöblom, (2017) "What is eSports and why do people watch it?", Internet Research, Vol. 27 Issue: 2, pp. 211-232, incorporated by reference herein). In practical terms, e-sports encompasses competitive and professional video gaming events that are spectated. E-sports can be spectated live in-person (e.g. at a tournament venue), via online broadcasts or online streaming, and via television broadcast, by way of example without limitation. Many e-sports events take the form of organized tournaments, featuring a multiplayer video game competition, especially between teams of players that may include both amateur and professional players. Common video game genres associated with e-sports include real-time strategy (RTS), fighting, first-person shooter (FPS), and multiplayer online battle arena (MOBA).

Video games are executed by computing devices such as personal computers, game consoles, mobile devices, etc. One example of a gaming platform is the Sony Playstation4® (PS4), which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to venue mapping for virtual reality spectating of electronic sports.

In some implementations, a method is provided, including the following operations: receiving, over a network from a client device, a request to spectate a live event through a head-mounted display by a virtual reality spectator; assigning the virtual reality spectator to a seat in a venue in which the live event takes place; receiving a plurality of video feeds from a plurality of cameras positioned in the venue; accessing video processing parameters that are stored in association with the seat; using the video processing parameters to select and stitch selected ones of the video feeds to generate a composite video that provides a view of the venue from a perspective that is substantially defined by a 3D location of the seat in the venue; transmitting the composite video over the network to the client device for rendering to the head-mounted display.

In some implementations, the video processing parameters identify which of the video feeds are selected for stitching, the video processing parameters being defined based on the 3D location of the seat to which the video processing parameters are associated, and 3D locations of the cameras that provide the video feeds.

In some implementations, assigning the virtual reality spectator to the seat includes identifying an occupancy status of seats in the venue, wherein the occupancy status for a given seat indicates whether the given seat is occupied by a real spectator in the venue, wherein the seat to which the virtual reality spectator is assigned is a seat that is not occupied by a real spectator.

In some implementations, the occupancy status for the given seat further indicates whether the given seat is occupied by another virtual reality spectator, wherein the seat to which the virtual reality spectator is assigned is a seat that is not occupied by another virtual reality spectator.

In some implementations, assigning the virtual reality spectator to the seat includes accessing a social graph of the virtual reality spectator, and selecting the seat based on proximity to a seat that is assigned to another virtual reality spectator that is a member of the social graph.

In some implementations, the method further includes: accessing audio processing parameters that are stored in association with the seat; using the audio processing parameters to generate audio data that simulates listening from a perspective that is substantially defined by the 3D location of the seat in the venue; transmitting the audio data over the network to the client device.

In some implementations, the audio processing parameters identify audio captured by one or more microphones in the venue, from which to generate the audio data, the audio processing parameters being defined based on the 3D location of the seat to which the audio processing parameters are associated, and 3D locations of the microphones.

In some implementations, non-transitory computer readable medium is provided, having program instructions embodied thereon that, when executed by at least one computer, cause said at least one computer to perform a method including the following operations: receiving, over a network from a client device, a request to spectate a live event through a head-mounted display by a virtual reality spectator; assigning the virtual reality spectator to a seat in a venue in which the live event takes place; receiving a plurality of video feeds from a plurality of cameras positioned in the venue; accessing video processing parameters that are stored in association with the seat; using the video processing parameters to select and stitch selected ones of the video feeds to generate a composite video that provides a view of the venue from a perspective that is substantially defined by a 3D location of the seat in the venue; transmitting the composite video over the network to the client device for rendering to the head-mounted display.

In some implementations, a system is provided, including at least one computing device, said at least one computing device having at least one processor and at least one memory, said at least one computing device configured to perform the following: receiving, over a network from a client device, a request to spectate a live event through a head-mounted display by a virtual reality spectator; assigning the virtual reality spectator to a seat in a venue in which the live event takes place; receiving a plurality of video feeds from a plurality of cameras positioned in the venue; accessing video processing parameters that are stored in association with the seat; using the video processing parameters to select and stitch selected ones of the video feeds to generate a composite video that provides a view of the venue from a perspective that is substantially defined by a 3D location of the seat in the venue; transmitting the composite video over the network to the client device for rendering to the head-mounted display.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 9A-1 and 9A-2 illustrate a head-mounted display (HMD), in accordance with an implementation of the disclosure.

DETAILED DESCRIPTION

The following implementations of the present disclosure provide devices, methods, and systems relating to venue mapping for virtual reality spectating of electronic sports. It will be obvious, however, to one skilled in the art, that the present disclosure may be practiced without some or all of the specific details presently described. In other instances, well known process operations have not been described in detail in order not to unnecessarily obscure the present disclosure.

In various implementations, the methods, systems, image capture objects, sensors and associated interface objects (e.g., controllers, gloves, peripheral devices, etc.) are configured to process data that is configured to be rendered in substantial real-time on a display screen. Broadly speaking, implementations are described with reference to the display being of a head mounted display (HMD). However, in other implementations, the display may be of a second screen, a display of a portable device, a computer display, a display panel, a display of one or more remotely connected users (e.g., whom may be viewing content or sharing in an interactive experience), or the like.

Figure 1A:
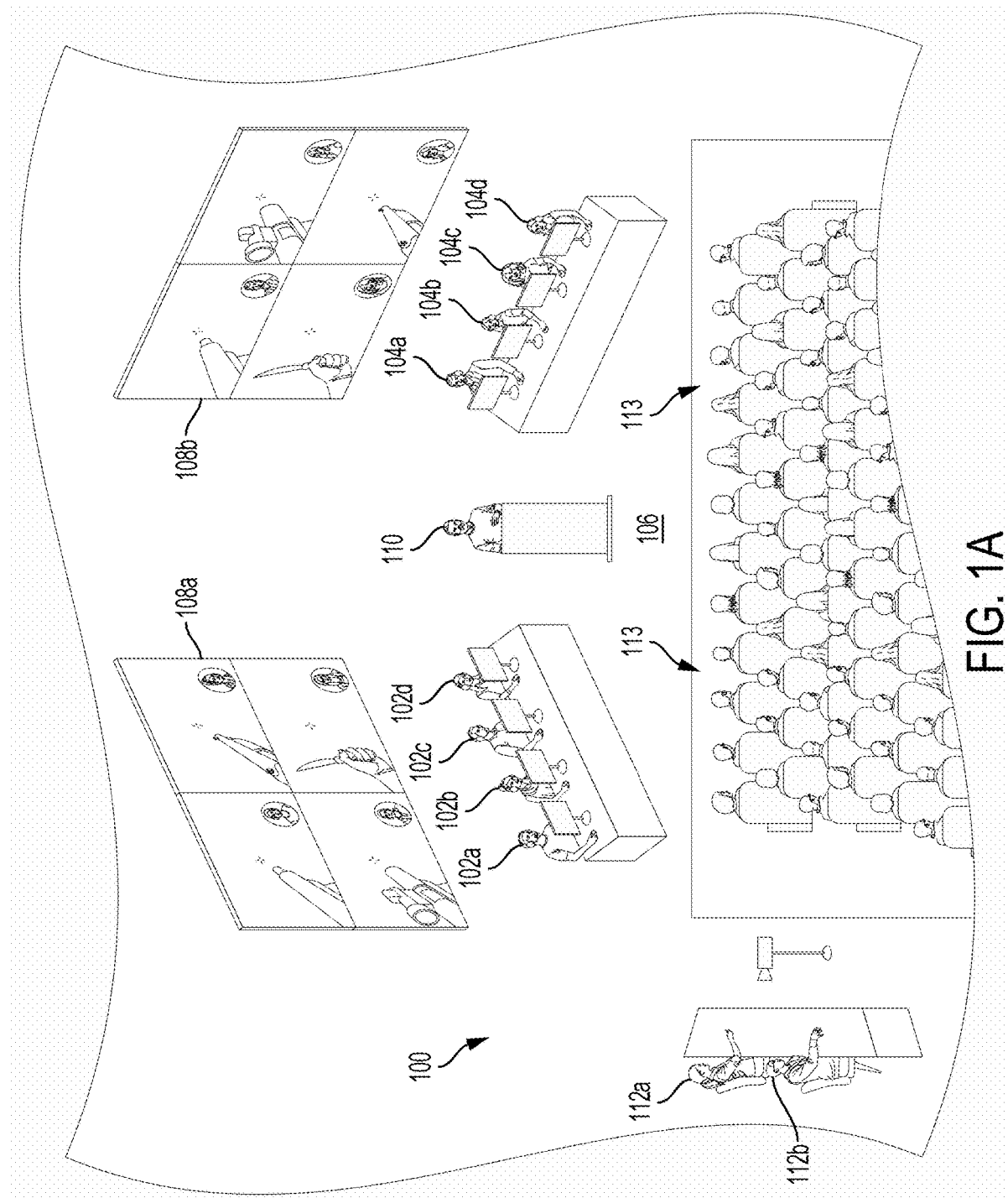
FIG. 1A illustrates a view of an electronic sports (e-sports) venue, in accordance with implementations of the disclosure.

FIG. 1A illustrates a view of an electronic sports (e-sports) venue, in accordance with implementations of the disclosure. E-sports generally refers to competitive or professional gaming that is spectated by various spectators or users, especially multi-player video games. As the popularity of e-sports has increased in recent years, so has the interest in live spectating of e-sports events at physical venues, many of which are capable of seating thousands of people. A suitable venue can be any location capable of hosting an e-sports event for live spectating by spectators, including by way of example without limitation, arenas, stadiums, theaters, convention centers, gymnasiums, community centers, etc.

However, the hosting and production of an e-sports event such as a tournament at a discreet physical venue means that not all people who wish to spectate in person will be able to do so. Therefore, it is desirable to provide a live experience to a remote spectator so that the remote spectator can experience the e-sports event as if he/she were present in-person at the venue where the e-sports event occurs.

With continued reference to FIG. 1A, a view of a venue 100 that is hosting an e-sports event is shown. A typical e-sports event is a tournament wherein teams of players compete against each other in a multi-player video game. In the illustrated implementation, a first team consists of players 102a, 102b, 102c, and 102d, and a second team consists of players 104a, 104b, 104c, and 104d. The first and second teams are situated on a stage 106, along with an announcer/host 110. The first team and second team are engaged in competitive gameplay of a multi-player video game against each other at the venue 100, and spectators 113 are present to view the event.

Large displays 108a, 108b, and 108c provide views of the gameplay to the spectators 113. It will be appreciated that the displays 108a, 108b, and 108c may be any type of display known in the art that is capable of presenting gameplay content to spectators, including by way of example without limitation, LED displays, LCD displays, DLP, etc. In some implementations, the displays 108a, 108b, and 108c are display screens on which gameplay video/images are projected by one or more projectors (not shown). It should be appreciated that the displays 108a, 108b, and 108c can be configured to present any of various kinds of content, including by way of example without limitation, gameplay content, player views of the video game, game maps, a spectator view of the video game, views of commentators, player/team statistics and scores, advertising, etc.

Additionally, commentators 112a and 112b provide commentary about the gameplay, such as describing the gameplay in real-time as it occurs, providing analysis of the gameplay, highlighting certain activity, etc.

Figure 1B:
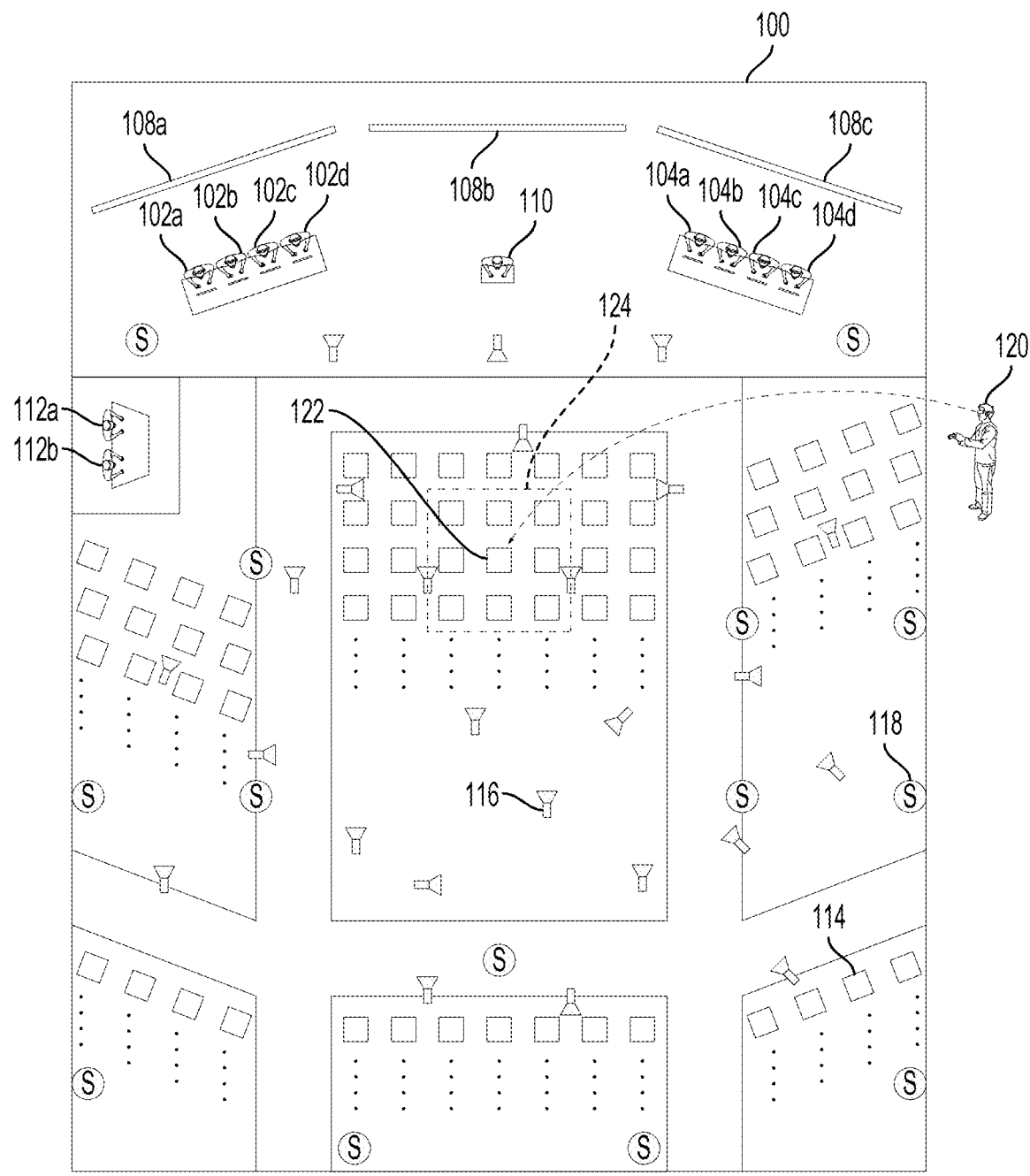
FIG. 1B is a conceptual overhead view of the venue, in accordance with implementations of the disclosure.

FIG. 1B is a conceptual overhead view of the venue 100, in accordance with implementations of the disclosure. As previously described, a first team and a second team of players are situated on the stage and engaged in gameplay of the multi-player video game. A number of seats 114 are conceptually shown, which are available for spectators to occupy when attending and viewing the e-sports event in person. As noted, there are large displays 108a, 108b, and 108c which provide views of the gameplay and other content for the spectators 113 to view. Additionally, there are a number of speakers 118, which may be distributed throughout the venue to provide audio for listening by the spectators, including audio associated with or related to any content rendered on the displays 108a, 108b, and 108c.

Furthermore, there are any number of cameras 116 distributed throughout the venue 100, which are configured to capture video of the e-sports event for processing, distribution, streaming, and/or viewing by spectators, both live in-person and/or remote, in accordance with implementations of the disclosure. It will be appreciated that some of the cameras 116 may have fixed locations and/or orientations, while some of the cameras 116 may have variable locations and/or orientations and may be capable of being moved to new locations and/or re-oriented to new directions. It will be appreciated that the cameras 116 may have various fields of view. Additionally, some of the cameras may be 360 degree cameras capable of capturing a 360 degree field of view (e.g. 360 degree horizontal field of view, and combined with a 180 degree vertical field of view, can provide a complete spherical field of view). Such 360 degree cameras typically include multiple image capture devices in a singular device package. In some implementations, multiple cameras are configured at substantially or approximately the same location, to enable a 360 degree field of view from the perspective of that location when their feeds are stitched together.

In accordance with implementations of the disclosure, a "live" viewing experience of the e-sports event can be provided to a virtual reality spectator 120. That is, the virtual reality spectator 120 is provided with a view through a head-mounted display (HMD) (or virtual reality headset) that simulates the experience of attending the e-sports event in person and occupying a particular seat 122 (or a specified location) at the venue 100. Broadly speaking, the three-dimensional (3D) location of the virtual reality spectator's seat 122 can be determined, and video feeds from certain ones of the various cameras 116 can be stitched together to provide a virtual reality view of the venue 100 from the perspective of the seat 122 (or the specified location to which the virtual reality spectator is assigned).

Furthermore, though not specifically shown, each camera may include at least one microphone for capturing audio from the venue 100. Also, there may be additional microphones distributed throughout the venue 100. Audio from at least some of these microphones can also be processed based on the 3D location of the virtual reality spectator's seat 122, so as to provide audio that simulates that which would be heard from the perspective of one occupying the seat 122.

Figure 1C:
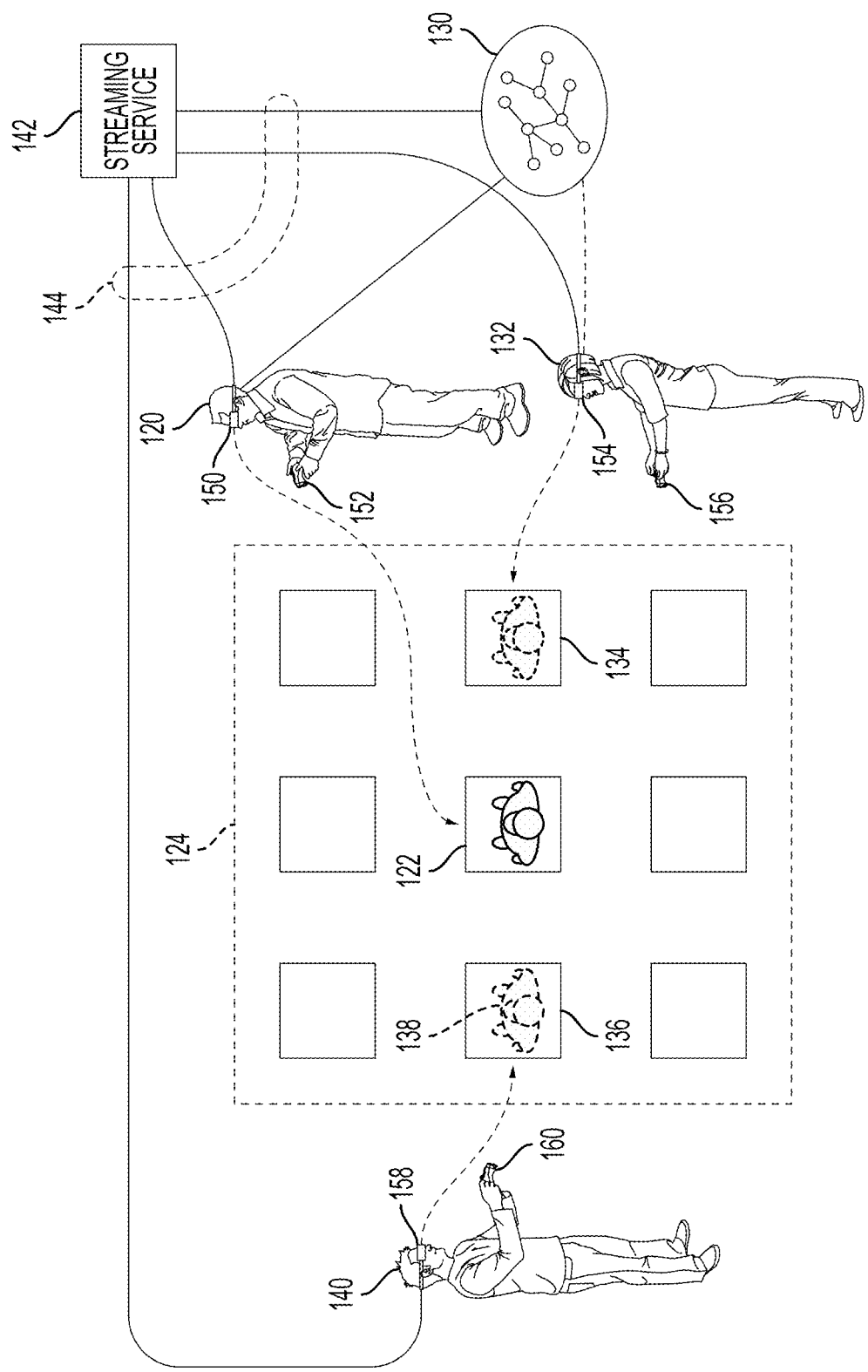
FIG. 1C conceptually illustrates a portion of seats from the venue in which the live e-sports event takes place, in accordance with implementations of the disclosure.

FIG. 1C conceptually illustrates a portion 124 of seats from the venue 100 in which the live e-sports event takes place, in accordance with implementations of the disclosure. As shown, the virtual reality spectator 120 is presented with a view through the HMD 150 that simulates occupying the seat 122 in the venue 100. In some implementations, the view of the e-sports event that is provided to the virtual reality spectator 120 is provided from a streaming service 142 over a network 144. That is, the streaming service 142 includes one or more server computers that are configured to stream video for rendering on the HMD 150, wherein the rendered video provides the view of the e-sports event to the virtual reality spectator 120. Though not specifically shown in the illustrated implementation, it should be appreciated that the streaming service 142 may first transmit the video in the form of data over the network 144 to a computing device that is local to the virtual reality spectator 120, wherein the computing device may process the data for rendering to the HMD 150.

The streaming service 142 may provide an interface to the virtual reality spectator 120 that enables the virtual reality spectator 120 to select or subscribe to one or more views to be streamed for rendering on the HMD 150. As noted, these views can be 360 degree views of the event/venue to provide an immersive spectating experience to the virtual reality spectator 120, the views being from the perspective of particular seats or locations in the venue.

It should be appreciated that the view provided is responsive in real-time to the movements of the virtual reality spectator 120, e.g., so that if the virtual reality spectator 120 turns to the left, then the virtual reality spectator 120 sees (through the HMD 150) the view to the left of the seat 122, and if the virtual reality spectator 120 turns to the right, then the virtual reality spectator 120 sees (through the HMD 150) the view to the right of the seat 122, and so forth. In some implementations, the virtual reality spectator 120 is provided with potential views of the e-sports venue 100 in all directions, including a 360 degree horizontal field of view. In some implementations, the virtual reality spectator 120 is provided with potential views of the e-sports venue 100 in a subset of all directions, such as a horizontal field of view of approximately 270 degrees in some implementations, or 180 degrees in some implementations. In some implementations, the provided field of view may exclude a region that is directly overhead or directly below. In some implementations, a region that is excluded from the field of view of the e-sports venue may be provided with other content, e.g. advertising, splash screen, logo content, game-related images or video, etc.

In some implementations, the virtual reality spectator 120 is able to select the seat through an interface, so that they may view the e-sports event from the perspective of their choosing. In some implementations, the seats that are available for selection are seats that are not physically occupied by spectators who are present in-person at the e-sports event. In other implementations, both seats that are unoccupied and seats that are occupied are selectable for virtual reality spectating.

In some implementations, the streaming service 142 may automatically assign a virtual reality spectator to a particular seat. In some implementations, this may be the best available seat (e.g. according to a predefined order or ranking of the available seats).

In some implementations, virtual reality spectators may be assigned to seats in proximity to other spectators based on various characteristics of the spectators. In some implementations, virtual reality spectators are assigned to seats based, at least in part, on their membership in a social network/graph. For example, with continued reference to FIG. 1C, another virtual reality spectator 132 may be a friend of the virtual reality spectator 120 on a social network 130 (e.g. as defined by membership in a social graph). The streaming service 142 may use this information to assign the virtual reality spectator 132 to a seat proximate to the virtual reality spectator 120, such as the seat 134 that is next to the seat 122 to which the virtual reality spectator 120 has been assigned. In the illustrated implementation, thus virtually "seated," when the virtual reality spectator 120 turns to the right, the virtual reality spectator 120 may see the avatar of the virtual reality spectator 132 seated next to them.

In some implementations, the interface for seat selection and/or assignment may inform a given user that one or more of their friends on the social network 130 is also virtually attending the e-sports event, and provide an option to be automatically assigned to a seat in proximity to one or more of their friends. In this way, friends that are attending the same event as virtual reality spectators may enjoy the event together.

In various implementations, virtual reality spectators can be assigned to seats in proximity to each other based on any of various factors such as a user profile, age, geo-location, primary language, experience in a given video game, interests, gender, etc.

In some implementations, these concepts can be extended to include in-person "real" spectators (who are physically present, as opposed to virtual reality spectators), when information is known about such real spectators. For example, it may be determined that the real spectator 138 that is seated in seat 136 is a friend of the virtual reality spectator 120, and so the virtual reality spectator 120 may be assigned (or offered to be assigned) to the seat 122 that is next to the seat 136 of the real spectator 138.

It will be appreciated that in order to provide input while viewing content through HMDs, the virtual reality spectators may use one or more controller devices. In the illustrated implementation, the virtual reality spectators 120, 132, and 140 operate controller devices 152, 156, and 160, respectively, to provide input to, for example, start and stop streaming of video for virtual reality spectating, select a seat in the e-sports venue 100 for spectating, etc.

It will be appreciated that spectators, whether virtual or real, may in some implementations, hear each other if they are in proximity to each other in the e-sports venue 100. For example, the virtual reality spectators 120 and 132 may hear each other as audio captured from their respective local environments (e.g. via microphones of the HMDs 150 and 154, the controllers 152 and 156, or elsewhere in the local environments of the spectators 120 and 132) is provided to the other's audio stream. In some implementations, the virtual reality spectator 120 may hear sound from the real spectator 138 that is captured by a local microphone.

In some implementations, a virtual reality spectator may occupy a seat that is physically occupied by a real spectator. For example, in the illustrated implementation, the virtual reality spectator may occupy the seat 136 that is physically occupied by the real spectator 138. The virtual reality spectator 140 is provided with a view simulating being in the position of the seat 136. When the virtual reality spectator 140 turns to the right they may see the avatar of the spectator 120; and likewise when the spectator 120 turns to their left, they may see the avatar of the spectator 140 in place of the real spectator 138.

Figure 2:
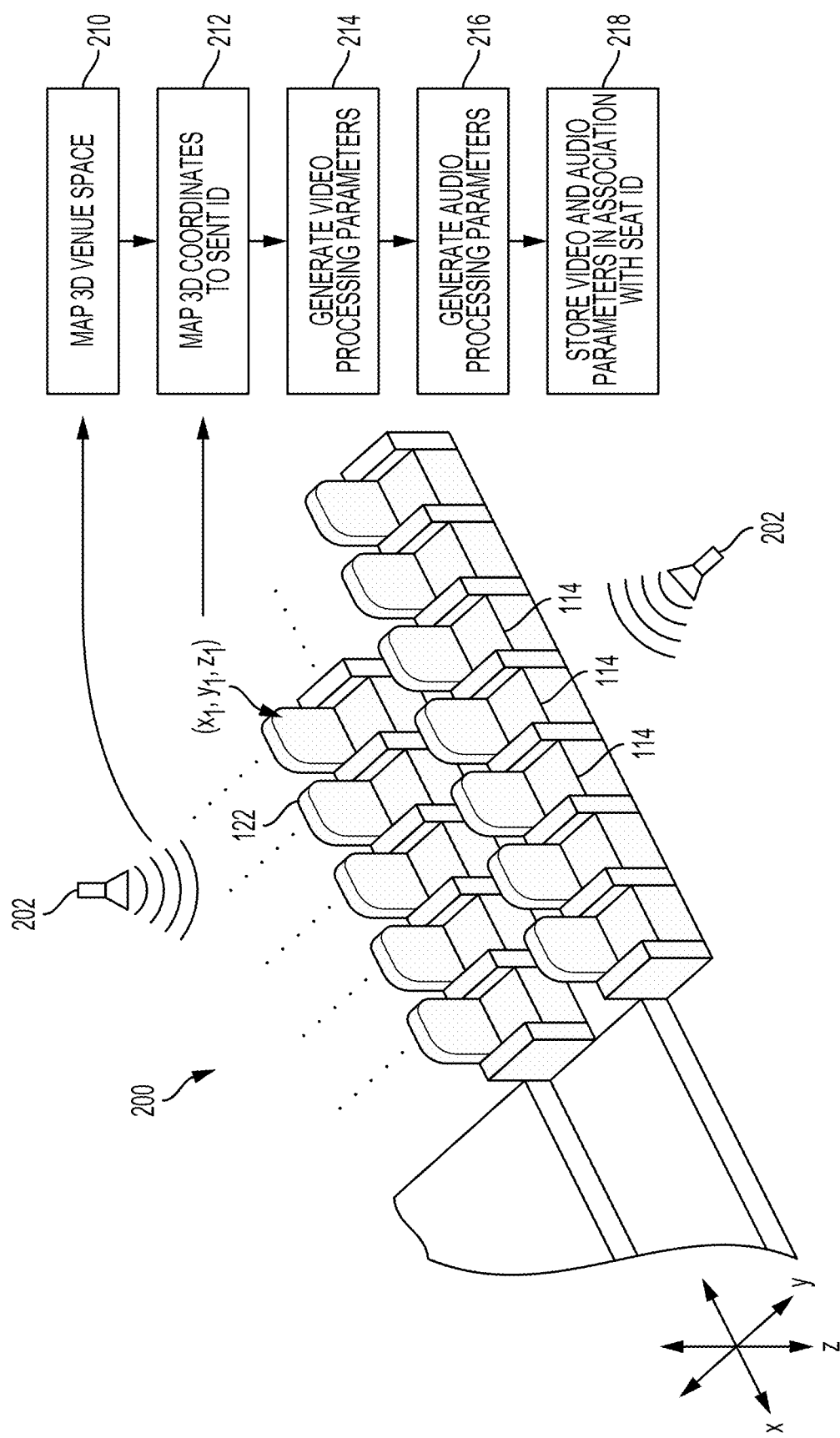
FIG. 2 conceptually illustrates a process for mapping the three-dimensional space of an e-sports venue to determine seat-specific parameters for virtual reality spectating, in accordance with implementations of the disclosure.

FIG. 2 conceptually illustrates a process for mapping the three-dimensional space of an e-sports venue to determine seat-specific parameters for virtual reality spectating, in accordance with implementations of the disclosure. Shown at left in the illustrated implementation, is the three-dimensional (3D) space 200 of the venue 100. In accordance with implementations of the disclosure, as indicated at reference 210, a 3D space map of the venue space 200 can be generated to facilitate determination of seat-specific parameters for virtual reality spectating.

Various technologies may be applied to generate a 3D space map of the space 200 of the venue 100. In some implementations, data from one or more sensor devices 202 are processed to generate the 3D space map. In various implementations, the sensor devices 202 can include any of the following: an image capture device (e.g. a camera), a depth sensing camera, an ultrasonic sensor, an IR camera, etc. The 3D space map of the venue space 200 enables 3D coordinates of each of the seats 114 in the venue 100 to be determined. In some implementations, each seat in the venue has a unique assigned identifier. As indicated at reference 212, for each seat, the corresponding 3D coordinates can be mapped to the seat's identifier. In some implementations, to facilitate generation of the 3D space map, various localization/positioning technologies may be employed, including by way of example without limitation, Wi-Fi based positioning, magnetic positioning, visual recognition of visual markers and/or visual features, etc. Sensors employing such localization/positioning technology may be placed at seat locations to determine their 3D locations in space.

In some implementations, the 3D space map also includes the 3D locations and directions of the cameras 116 in the 3D space 200 of the venue 100. Using this information, then at reference 214, video processing parameters for each seat are generated. For a given seat, the video processing parameters define, based on the view direction in the 3D space, which cameras' video feeds will be stitched, and how they will be stitched, in order to generate a view of the venue space from the perspective of a given seat (or rather, from the perspective of the 3D coordinates corresponding to the given seat). For cameras whose direction is variable (e.g. controlled by an operator), if relevant for the given seat, the video processing parameters may identify such cameras as potential video feed sources depending upon direction of the cameras, and further define how video from such cameras will be stitched (based on view direction of the virtual reality spectator), such as parameters relating to spatial projection of video feeds, alignment, blending, anchor points, etc. It will be appreciated that the video stitching process may be configured to generate 3D or 2D video in various implementations. Generating a 3D video can entail generation of separate videos for each eye.

As indicated at reference 216, in accordance with implementations of the disclosure, audio processing parameters are generated for each seat in the venue 100. In some implementations, the 3D space is acoustically modeled using the 3D space map, to determine acoustic characteristics of the 3D space. In some implementations, microphones are placed at various locations in the venue to determine acoustic properties. For example, sounds may be played through the speakers 118 of the venue, and audio recorded from the microphones can be analyzed in view of the microphones' known locations, to determine acoustic properties and enable acoustic modeling of the 3D space. This may be used to generate audio processing parameters for each seat. The audio processing parameters for a given seat can define how audio from various sources—such as gameplay audio, commentator audio, audio from live microphones in the venue 100, etc.—is processed to provide audio to a virtual reality spectator assigned to the given seat.

As indicated at reference 218, the video processing parameters and audio processing parameters for a given seat are stored in association with that seat's identifier (ID). In some implementations, the video processing parameters and audio processing parameters for a given seat form at least part of a seat profile for a given seat in the venue.

While the foregoing mapping of the venue space has been described with reference to seats in the venue, it should be appreciated that the concepts can be applied to any specified location within the venue. In some implementations, one or more specified locations within the venue are identified (that may or may not coincide with particular seats in the venue), and video processing parameters and audio processing parameters are determined for the specified locations in accordance with the above, e.g. so as to provide 360 degree views from the perspective of the specified locations. In some implementations, a virtual reality spectator may choose from such available locations for spectating the live event. That is, the virtual reality spectator may select a view or set of views to stream the live event for spectating through their HMD.

Figure 3:
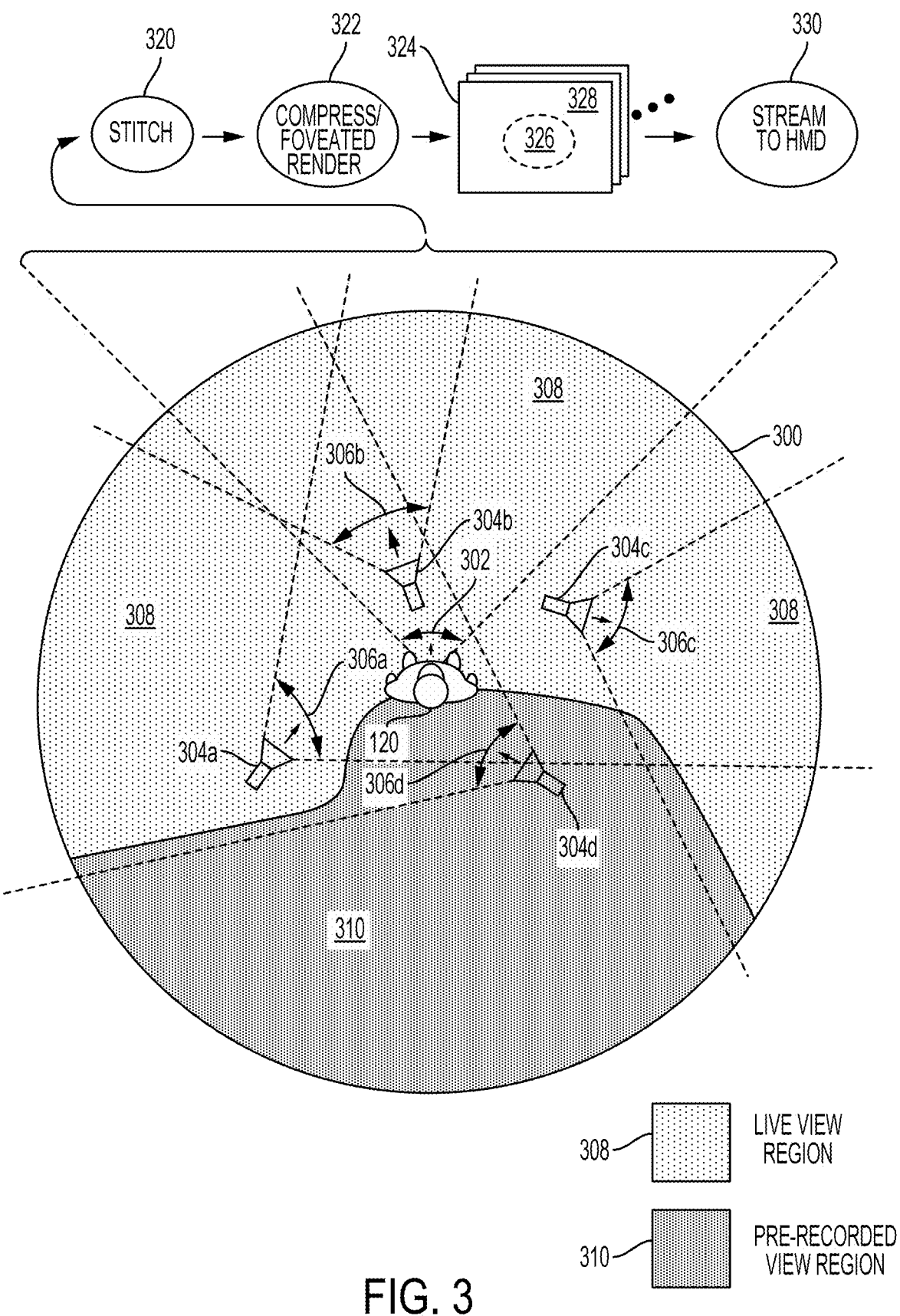
FIG. 3 conceptually illustrates a field of view of a virtual reality spectator, in accordance with implementations of the disclosure.

FIG. 3 conceptually illustrates a field of view of a virtual reality spectator, in accordance with implementations of the disclosure. As shown, the virtual reality spectator 120 has a 360 degree field of view 300 that is conceptually represented in the illustrated implementation. The 360 degree field of view 300 can be, by way of example without limitation, a horizontal field of view in some implementations, or a vertical field of view in some implementations, or representative of any other plane of field of view in various implementations.

As has been noted above, the view of the e-sports venue 100 that is provided to the virtual reality spectator 120 can be stitched together from video feeds from multiple cameras in the e-sports venue 100. In the illustrated implementation, a camera 304a provides a video feed having a field of view 306a; a camera 304b provides a video feed having a field of view 306b; a camera 304c provides a video feed having a field of view 306c; and, a camera 304d provides a video feed having a field of view 306d. Depending upon the direction that the virtual reality spectator 120 is looking, various ones of the video feeds from the different cameras are selected to be stitched to form the video for rendering to the HMD (150) that provides the appropriate view to the virtual reality spectator 120. In the illustrated implementation, the virtual reality spectator 120 is shown looking in a direction so as to have a field of view 302. Based on this, the video rendered for viewing by the virtual reality spectator 120 may be stitched together from the video feeds of the cameras 304a, 304b, and 304d. The video feed from camera 304c is not used for purposes of providing the current view as it does not cover any portion of the region encompassed by the virtual reality spectator's field of view 302.

It will be appreciated that the various cameras have different locations in the 3D venue space and therefore have different perspectives. The use or non-use (and manner of stitching if used) of video feeds from these cameras for purposes of providing a view to a specific virtual reality spectator may thus further depend upon their directionality and/or perspective locations. For example, in some implementations, a video feed covering a region currently being viewed by a virtual reality spectator, but in a direction substantially opposite that of the virtual reality spectator's viewing direction, is not be used to provide the video for the virtual reality spectator.

As has been noted, some cameras may have fixed directions, while other cameras have variable directions that may change. Therefore, in some implementations, current direction information of cameras is obtained, and used for purposes of determining whether to use a given camera's video feed, and/or how to use a given camera's video feed if selected.

In some implementations, the direction of a given camera is adjusted based on the field of view of a virtual reality spectator. For example, the direction of a camera may be adjusted so that its field of view covers at least a portion of the region being viewed by the virtual reality spectator. In some implementations, the direction of a given camera is adjusted in a fashion that optimizes its field of view based on the fields of view of multiple virtual reality spectators. In some implementations, a density mapping of the virtual reality spectators' fields of view is determined, that identifies and/or quantifies relative amounts that various regions of space are being spectated. Based on this information, directions of cameras can be determined and adjusted, for example, to prioritize regions of space that are being spectated to a higher degree.

It will be appreciated that the available video feeds from the various cameras may not provide coverage (including necessary direction and/or perspective) of all regions that a given virtual reality spectator is viewing. The coverage region that can be provided based on the available video feeds defines a region of the venue space that is available for live viewing. With continued reference to FIG. 3, the fields of view 306a, 306b, 306c, and 306d of the available cameras together define a live view region 308, which is the region of the 360 degree field of view 300 that can be provided with a live real-time view of the venue space, as determined by the coverage of the venue space afforded by the video feeds from the available cameras.

In some implementations, the remaining region that is not afforded a live view, can be presented with a pre-recorded view, defining a pre-recorded view region 310 in the illustrated implementation. That is, video or images of the region 310 may be recorded from an earlier time (e.g. when one or more of the cameras was directed so as to cover at least part of the region 310), and the pre-recorded video/images can be stitched and rendered to provide the view of the region 310. It will be appreciated that in some implementations, when the field of view of the virtual reality spectator 120 encompasses portions of both the live view region 308 and the pre-recorded view region 310, that the view that is presented to the virtual reality spectator 120 is a composite generated from both live video and pre-recorded video/images.

In other implementations, regions of the virtual reality spectator's field of view 300 that are not available for live viewing may be presented with other content, e.g. advertising/sponsor content, game-related content, etc.

With continued reference to FIG. 3, as indicated at reference 320, the video feeds from various cameras may be stitched together to form the video providing the appropriate view for the virtual reality spectator 120 based on their current field of view 302. Furthermore, as indicated at reference 322, the stitched video may undergo further processing, such as a compression process to reduce the amount of data that is transmitted. In some implementations, the compression process may include foveated rendering, whereby regions of the image frames that the virtual reality spectator 120 is determined to be looking at, e.g. as determined from gaze direction information detected by the HMD 150, are rendered with higher image quality than other regions, such as through use of increased resolution, update frequency, bitrate, colors, dynamic range, sharpness, contrast, or any other parameter affecting image quality. The output of the compression process are image frames 324 that define the video for the virtual reality spectator 120. As shown in the illustrated implementation, the region 326 in the video image frame is rendered with higher image quality than the region 328.

Then as indicated at reference 330, the compressed image frames are transmitted/streamed for viewing through the virtual reality spectator's HMD 150.

Figure 4:
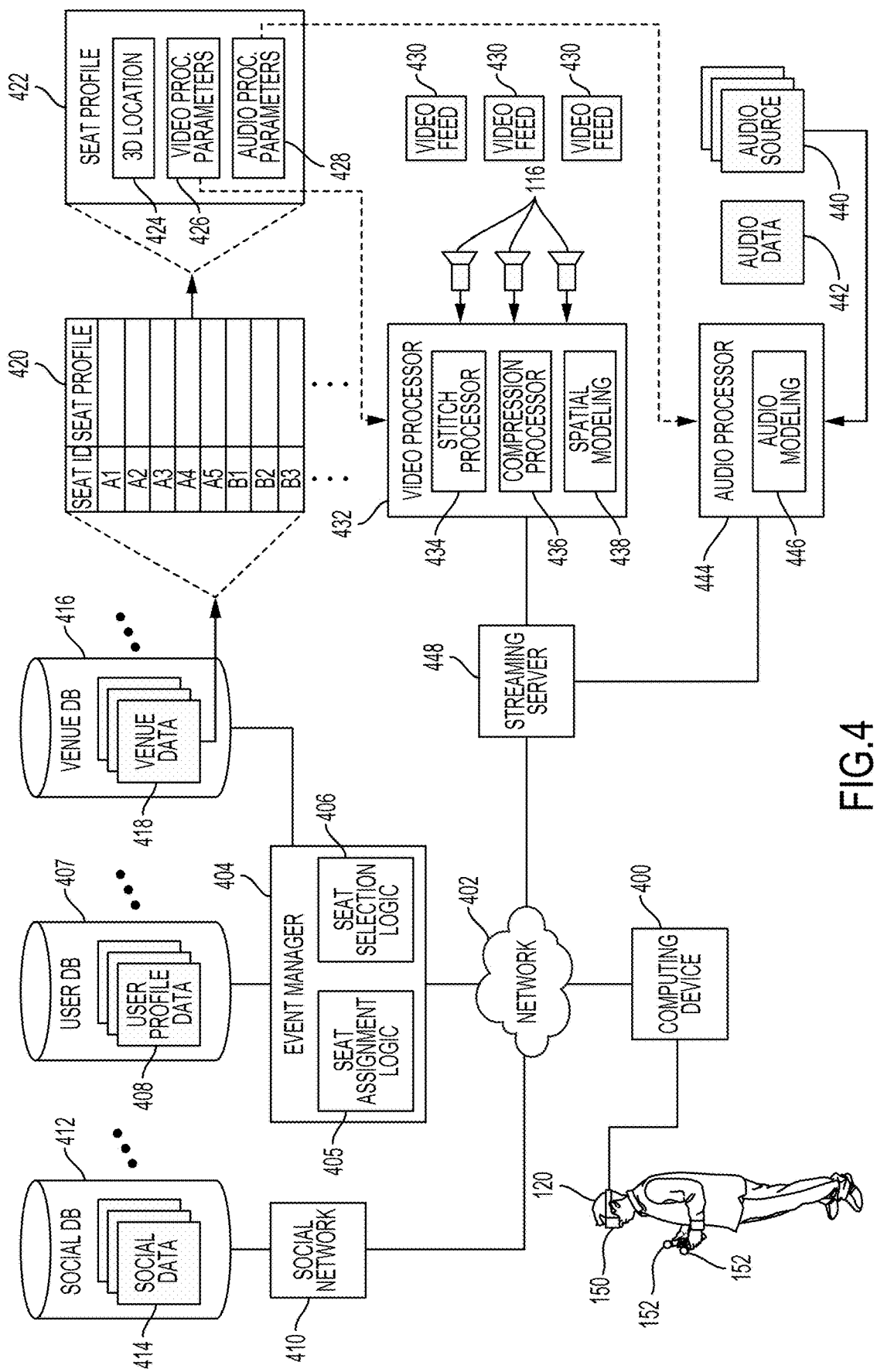
FIG. 4 conceptually illustrates a system for providing virtual reality spectating of an e-sports event, in accordance with implementations of the disclosure.

FIG. 4 conceptually illustrates a system for providing virtual reality spectating of an e-sports event, in accordance with implementations of the disclosure. Though not specifically described in detail for purposes of ease of description, it will be appreciated that the various systems, components, and modules described herein may be defined by one or more computers or servers having one or more processors for executing program instructions, as well as one or more memory devices for storing data and said program instructions. It should be appreciated that any of such systems, components, and modules may communicate with any other of such systems, components, and modules, and/or transmit/receive data, over one or more networks, as necessary, to facilitate the functionality of the implementations of the present disclosure. In various implementations, various portions of the systems, components, and modules may be local to each other or distributed over the one or more networks.

In the illustrated implementation, a virtual reality spectator 120 interfaces with systems through an HMD 150, and uses one or more controller devices 152 for additional interactivity and input. In some implementations, the video imagery displayed via the HMD to the virtual reality spectator 120 is received from a computing device 400, that communicates over a network 402 (which may include the Internet) to various systems and devices, as described herein.

In order to initiate access to spectate an e-sports event, the virtual reality spectator 120 may access an event manager 404, which handles requests to spectate an e-sports event. The event manager 404 can include seat assignment logic 405 configured to assign the virtual reality spectator 120 to a particular seat in the venue of the e-sports event. The seat assignment logic 405 can utilize various types of information to determine which seat to assign the virtual reality spectator 120, including based on user profile data 408 for the spectator that is stored to a user database 407. By way of example, such user profile data 408 can include demographic information about the user such as age, geo-location, gender, nationality, primary language, occupation, etc. and other types of information such as interests, preferences, games played/owned/purchased, game experience levels, Internet browsing history, etc.

In some implementations, the seat assignment logic 405 can also use information obtained from a social network 410 to, for example, assign spectators that are friends on the social network to seats that are proximate or next to each other. To obtain such information, the social network 410 may store social information about users (including social graph membership information) to a social database 412 as social data 414. In some implementations, the seat assignment logic 405 may access the social data (e.g. accessing a social graph of a given user/spectator) through an API of the social network 410.

In some implementations, the seat assignment logic 405 is configured to determine which seats are available, e.g. not occupied by real and/or virtual spectators, and assign a virtual reality spectator based at least in part on such information. In some implementations, the seat assignment logic 405 is configured to automatically assign a virtual reality spectator to the best available seat, as determined from a predefined ranking of the seats in the venue.

It will be appreciated that the seat assignment logic 405 can use any factor described herein in combination with any other factor(s) to determine which seat to assign a given virtual reality spectator. In some implementations, available seats are scored based on various factors, and the seat assignment is determined based on the score (e.g. virtual reality spectator is assigned to highest scoring seat). In some implementations, the seat assignment logic 405 presents a recommended seat for acceptance by the spectator 120, and the spectator 120 is assigned to the recommended seat upon the acceptance thereof.

In other implementations, the virtual reality spectator 120 may access an interface provided by a seat selection logic 406 that is configured to enable the virtual reality spectator to select a given seat from available seats.

A venue database 416 stores data about one or more venues as venue data 418. The venue data 418 can include any data describing the venue, such as a 3D space map, the locations of cameras, speakers, microphones, etc. The venue data 418 may further include a table 420 associating seat profiles to unique seat identifiers. In some implementations, each seat has its own seat profile. In some implementations, a group of seats (e.g. in close proximity to each other) may share the same seat profile. An example seat profile 422 includes information such as the 3D location 424 of the seat, video processing parameters 426, and audio processing parameters 428.

A video processor 432 includes a stitch processor 434 that may use the video processing parameters 426 and/or the 3D location 424 of the spectator's assigned seat to stitch together video feeds 430 from cameras 116, so as to generate a composite video that provides the view for the virtual reality spectator 120 in accordance with the virtual reality spectator's view direction. In some implementations, spatial modeling module 438 generates or accesses a spatial model of the 3D environment of the venue (e.g. including locations of cameras and the location of the spectator's seat) in order to facilitate stitching of the video feeds 430. The stitching of the video feeds may entail spatial projection of the video feeds to provide a perspective-correct video for the spectator. In some implementations, the resulting composite video is a 3D video, whereas in other implementations the composite video is a 2D video.

A compression processor 436 is configured to compress the raw composite video, employing video compression techniques known in the art, as well as foveated rendering, to reduce the amount of data required for streaming. The compressed video data is then streamed by the streaming server 448 over the network 402 to the computing device 400, which processes and/or renders the video to the HMD 150 for viewing by the virtual reality spectator 120.

In some implementations, the video feeds are transmitted from the cameras to one or more computing devices that are local to the cameras/venue which also perform the video processing. In some implementations, the cameras are directly connected to such computing devices. In some implementations, the video feeds are transmitted over a local network (e.g. including a local area network (LAN), Wi-Fi network, etc.) to such computing devices. In some implementations, the computing devices are remotely located, and the video feeds may be transmitted over one or more networks, such as the Internet, a LAN, a wide area network (WAN), etc.

An audio processor 444 is configured to process audio data 442 from audio sources 440 to be streamed with the compressed video data. The processing may use the audio processing parameters 428 and/or the 3D location 424 of the spectator's seat. In some implementations, an audio modeling module 446 applies an audio model based on the 3D space of the venue to process the audio data 442. Such an audio model may simulate the acoustics of the assigned seat in the venue so that audio is rendered to the virtual reality spectator in a realistic fashion. By way of example without limitation, sounds from other virtual reality spectators may be processed to simulate not only directionality relative to the seat location of the virtual reality spectator 120, but also with appropriate acoustics (such as delay, reverb, etc.) for the seat location in the venue. As noted, audio sources can include gameplay audio, commentator(s), house music, audio from microphones in the venue, etc.

Figure 5:
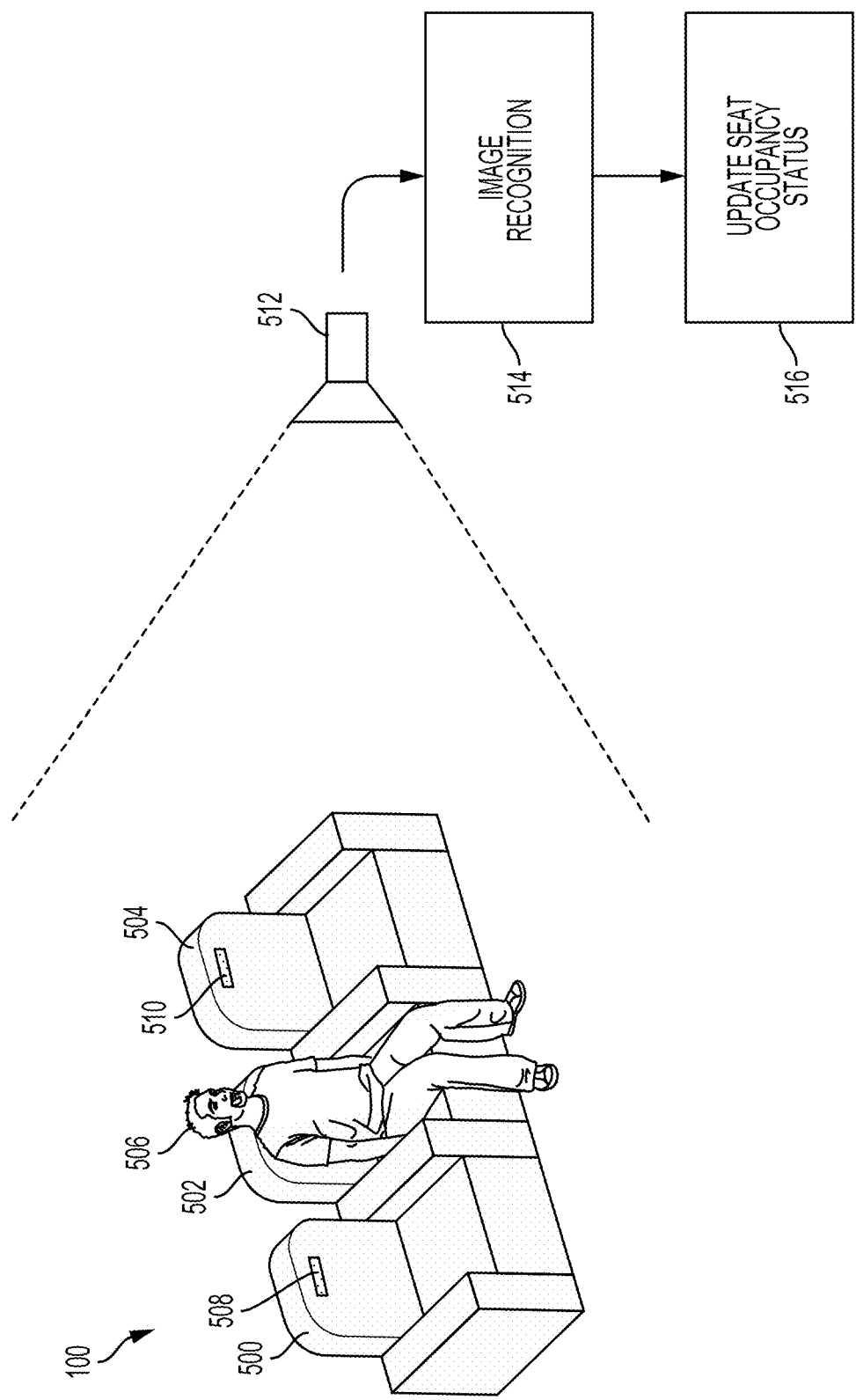
FIG. 5 illustrates techniques for determining whether seats in a venue are occupied by real spectators, in accordance with implementations of the disclosure.

FIG. 5 illustrates techniques for determining whether seats in a venue are occupied by real spectators, in accordance with implementations of the disclosure. In the illustrated implementation, various seats 500, 502, and 504 in a venue 100 are shown. The seat 502 is occupied by a real spectator 506. A camera 512 can be configured to capture images of the seats. The captured images can be analyzed according to an image recognition process 514, which may search the images for indicators that a given seat is occupied. By way of example without limitation, the image recognition process may include facial recognition or other forms of person recognition to identify the presence of a person occupying a given seat, motion detection to detect motion occurring in proximity to a given seat, image recognition of an empty seat configuration, etc.

In some implementations, seats may include (or have affixed thereto) a tag that can be recognized through the image recognition process 514. In the illustrated implementation, a tag 508 is attached to seat 500, and a tag 510 is attached to seat 504. The seat 502 is occupied by the real spectator 506, and therefore a tag attached to seat 502 is no longer visible, and will not be recognized. In this manner, empty seats can be identified by identifying the tags in the captured images from the camera 512. The tags may take any recognizable form in various implementations, including by way of example without limitation, a retroreflector or retroreflective material, a recognizable image/pattern/graphic, a light (e.g. LED), particular color(s), etc.

Tags may be attached to any portion of a seat, including by way of example without limitation, along the seat back or seat cushions, in some implementations, more specifically along the top portion of the seat back or seat cushion, in the case of folding seat cushions, along the front portion of the seat cushions so as to be visible when the seat cushion is folded up when the seat is unoccupied, along an armrest, etc. Furthermore, it will be appreciated that a given seat may have any number of tags attached thereto.

As indicated at reference 516, based on detection of empty or occupied seats in accordance with the above, the occupancy status of a given seat can be updated to reflect whether it is occupied or empty. As noted previously, in some implementations, empty seats are made available for virtual reality spectating of the venue 100.

Figure 6:
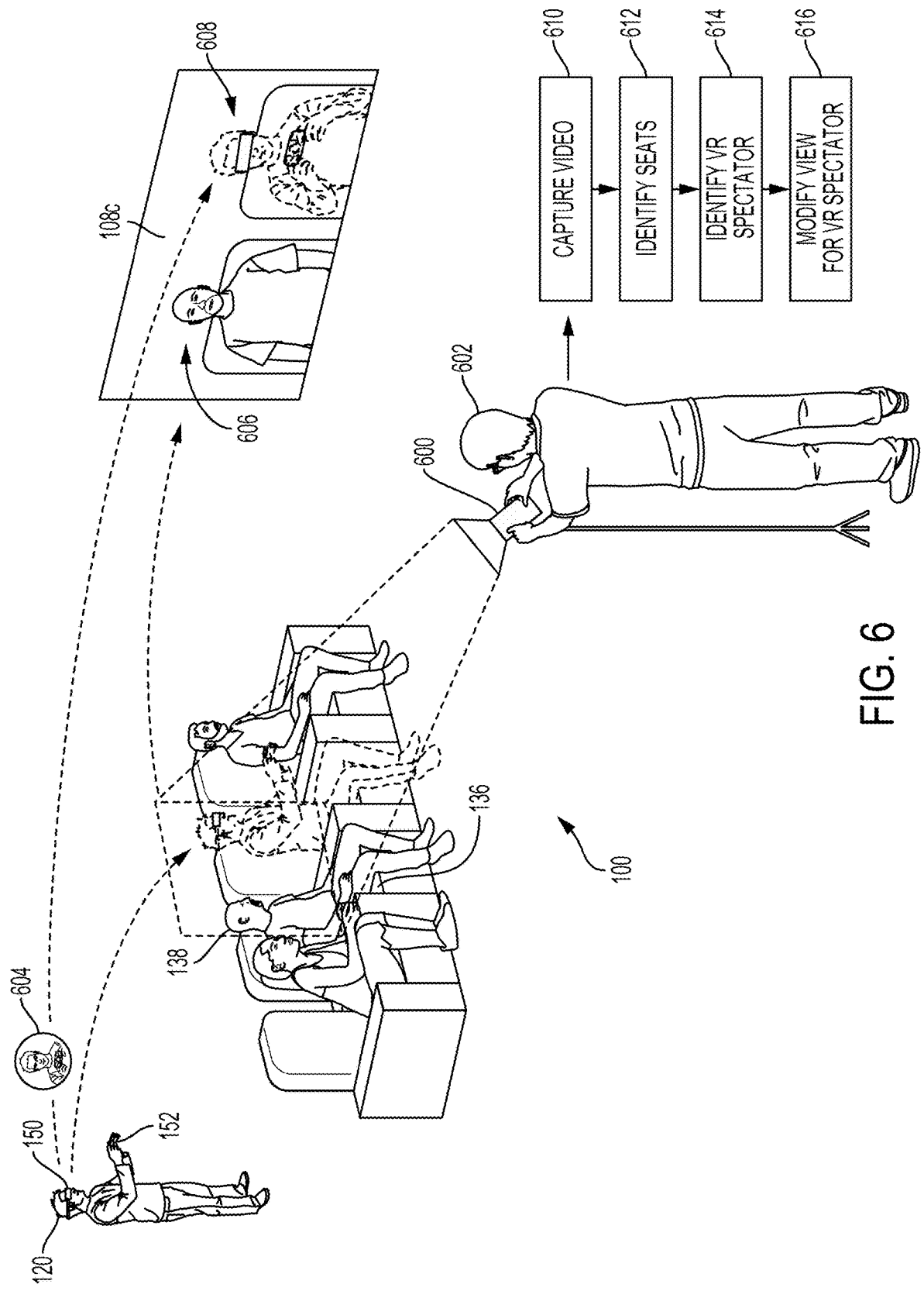
FIG. 6 illustrates a method for a virtual reality spectator to see himself/herself in the context of a real venue, in accordance with implementations of the disclosure.

FIG. 6 illustrates a method for a virtual reality spectator to see himself/herself in the context of a real venue, in accordance with implementations of the disclosure. In the illustrated implementation, the e-sports event takes place in the venue 100, in which there are many seats. For example, a seat 136 is occupied by a real spectator 138. The virtual reality spectator 120 is able to "occupy" the seat 122, and so experience a view through the HMD 150 of the venue 100 as if the virtual reality spectator 120 was actually present in the seat 122.

A camera 600 may be operated by an operator 602, and directed towards the seats 122 and 136, thereby capturing video of the real spectator 138 in the seat 136. This video, or a portion thereof, may be projected onto the display 108c, which may be one of the large displays in the venue 100 which are viewable by many spectators simultaneously. As shown, the projected video rendered on the display 108c shows an image 606 of the real spectator 138.

However, in some implementations, when the virtual reality spectator 120 looks towards the display 108c, he/she will also see himself/herself in the projected video shown on the display 108c. That is, when video projected on the display 108c includes the location of the seat 122 that the virtual reality spectator "occupies" (or is assigned to), then in the view provided through the HMD to the virtual reality spectator 120 that includes the display 108c, the rendered image of the display 108c is altered to include images of the virtual reality spectator 120 (or an avatar 604 associated to the virtual reality spectator 120) in the appropriate location so as to occupy seat 122. In this manner, the virtual reality spectator 120 is able to see himself/herself in the seat 122 at the venue 100, thus further increasing the realism and interactivity of the experience for the virtual reality spectator 120. As shown in the illustrated implementation, the rendered video on the display 108c that is viewed by the virtual reality spectator 120 will include an image 608 of the virtual reality spectator 120 (or their associated avatar 604).

It will be appreciated that in some implementations, the video that is actually rendered on the display 108c in the venue 100 is not altered to include the virtual reality spectator's image. However, in other implementations, the video that is actually rendered on the display 108c in the venue 100 is altered to include the virtual reality spectator's image.

With continued reference to FIG. 6, a method for performing the above-described video alteration to include a virtual reality spectator is shown. At operation 610, video is captured by a camera in the venue, the video including a location/seat to which a virtual reality spectator has been assigned, which defines the location from which the virtual reality spectator is provided with views of the venue through an HMD.

At operation 612, the seats and/or locations that are captured by the camera are determined. This may entail determining the 3D location and/or direction of the camera within the venue, in order to determine which seats are being captured in the video. For example, using the known location and direction of the camera, then the 3D space within the venue that is captured in the video can be determined, and using a mapping of seats to 3D locations in the venue, then the particular seats that are captured in the video can be identified. By way of example without limitation, the location/direction of the camera can be determined using any kind of localization/positioning technology known in the art, including Wi-Fi based positioning, magnetic positioning, recognition of visual markers and/or visual features, etc.

At operation 614, for a given identified seat, it is determined whether a virtual reality spectator is assigned to the seat, and if so, then the virtual reality spectator is identified. At operation 616, when the view provided to the virtual reality spectator includes a display on which the captured video would be rendered in the venue, then the view of the display is modified so as to show the virtual reality spectator or their representative avatar in the seat that is occupied by the virtual reality spectator. For example, the view direction of the virtual reality spectator can be tracked to determine when the view includes the display. When this is the case, the view can be modified as discussed above to include the virtual reality spectator. In some implementations, the image of the virtual reality spectator (or their avatar) is formed as an overlay in the view of the display presented to the virtual reality spectator. In some implementations, a camera's video feed that includes the display is modified to include the image of the virtual reality spectator (or avatar), and the modified video feed is stitched as previously discussed to form the view for the virtual reality spectator.

Figure 7:
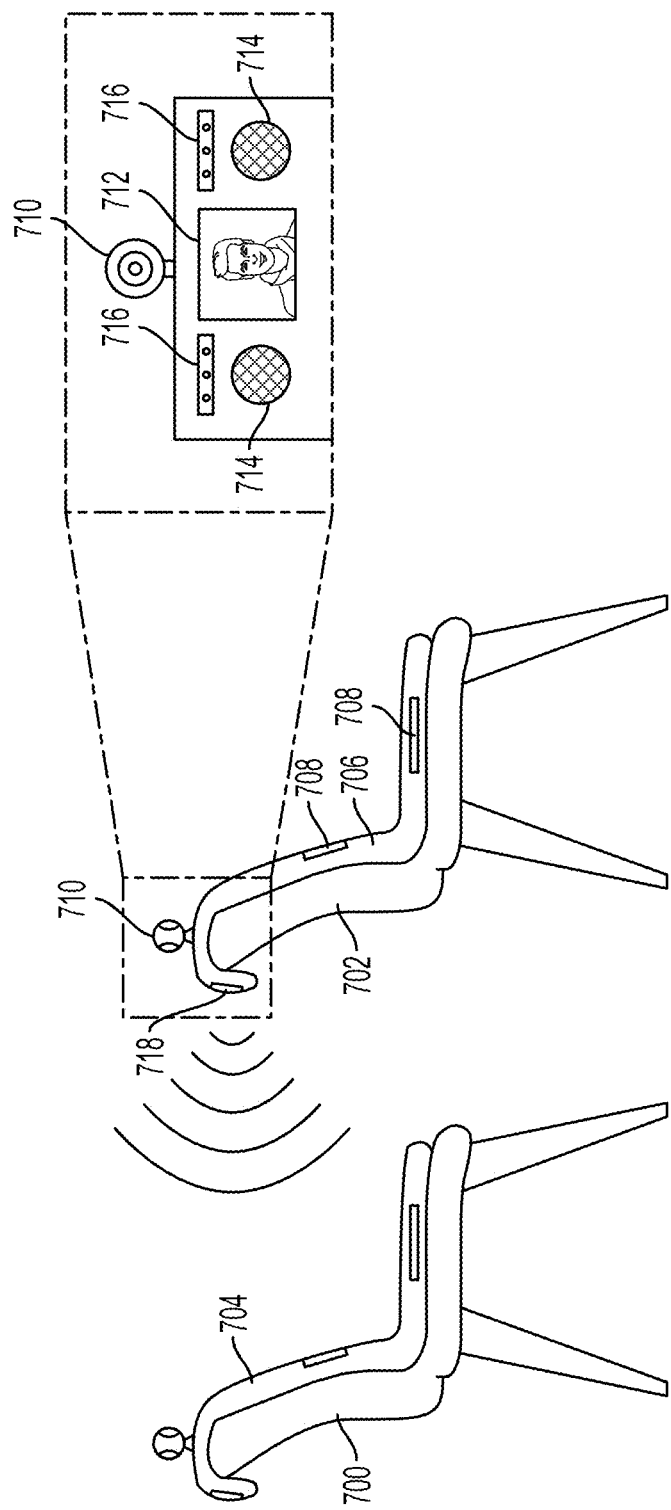
FIG. 7 illustrates seats in venue having additional functionality for sensing real spectators and enabling interactivity of virtual reality spectators, in accordance with implementations of the disclosure.

FIG. 7 illustrates seats in venue having additional functionality for sensing real spectators and enabling interactivity of virtual reality spectators, in accordance with implementations of the disclosure. In the illustrated implementation, a seat 700 and seat 702 are shown, the seat 702 being in front of seat 700. Also shown are sensor units 704 and 706, which are configured for seats 700 and 702, respectively. In some implementations, the sensor units are separate attachments that are removable from the seats. In some implementations, the sensor units and/or any of their components as described herein can be incorporated as part of the seats.

For ease of description, the sensor unit 706 is herein described, and it will be appreciated that the same applies to the sensor unit 704. The sensor unit 706 includes one or more occupancy sensors 708 which are configured to detect whether the seat 702 is occupied by a real spectator. As shown, the occupancy sensors 708 can be positioned along the seat bottom and/or seat back. In some implementations, the occupancy sensors 708 include one or more pressure sensors that detect when pressure is applied to sense whether a person is sitting in the seat 702. Additionally, such pressure sensors can determine/quantify how much pressure (force) is being applied, which may enable distinguishing between the weight of a person as opposed to another object. In some implementations, the occupancy sensors 708 include one or more proximity sensors that can detect when another object is proximate (e.g. within a predefined distance) and possibly the distance of the object from the proximity sensor.

In some implementations, the sensor unit 706 further includes a camera 710 configured to capture video/images from the perspective of the seat 702, which can be used to provide a view of the venue to a virtual reality spectator that is assigned to the seat 702. In some implementations, the camera 710 is a spherical panoramic camera capable of capturing a 360 degree field of view. In various implementations, the camera 710 includes one or more image capture devices. In some implementations, the camera 710 is a stereoscopic camera capable of providing stereoscopic images with 3D depth.

In some implementations, the sensor unit 706 further includes one or more microphone arrays 716, each microphone array including a plurality of microphones. Sound from a microphone array can be processed to identify the location of a sound source based on analyzing differences in the timing of sound reception between different microphones. Sound captured by the microphone arrays can be processed and/or provided to the virtual reality spectator assigned to the seat 702, so as to enable the virtual reality spectator to experience sound that is from the location in the venue at which they are virtually positioned.

In some implementations, the sensor unit 712 includes hardware to enable the virtual reality spectator to interact with spectators in adjacent or nearby seats. In the illustrated implementation, the sensor unit 712 further includes a display 712 and speakers 714. The display 712 can display images of the virtual reality spectator (or an avatar) assigned to the seat 702, to allow real spectators in nearby seats to see the virtual reality spectator (or their avatar). In some implementations, the virtual reality spectator can communicate through the speakers 714, such that sound from the virtual reality spectator (e.g. captured by a microphone of the virtual reality spectator's HMD or in their local environment) can be transmitted to the sensor unit 706 and output through the speakers 714. Likewise, a nearby real spectator may speak and this will be captured by the microphone arrays 716 and transmitted to the virtual reality spectator's HMD so that the virtual reality spectator can hear the nearby real spectator. In this manner, a real spectator and a virtual reality spectator may interact with each other. It will be appreciated that the virtual reality spectator can see a nearby real spectator through the camera 710 in some implementations.

In some implementations, the sensor unit 706 includes a rear-facing sensor 718, which may be configured to detect occupancy of the seat 700 that is behind the seat 702. In some implementations, the rear-facing sensor can be a proximity sensor, and may use IR, ultrasonic, or other sensing technologies.

In some implementations, the sensor unit 706 includes positioning technology that enables the location of the sensor unit to be determined. This may include, by way of example without limitation, Wi-Fi positioning, magnetic positioning, GPS, etc.

The sensor unit 706 may further communicate and transmit/receive data over one or more networks, such as a cellular, Wi-Fi, or other type of network, including wireless and/or wired networks.

In some implementations, the sensor unit 706 includes a tag that is recognizable through image recognition processes, so that the sensor unit can be identified in captured images by the cameras in the venue.

Though implementations of the present disclosure have generally been described with reference to e-sports events and e-sports venues, it should be appreciated that in other implementations, the principles of the present disclosure can be applied to any other type of spectated live event and corresponding venue, including by way of example without limitation, sporting events (e.g. football, basketball, baseball, soccer, hockey, etc.), concerts, ceremonies, presentations, etc.

Figure 8:
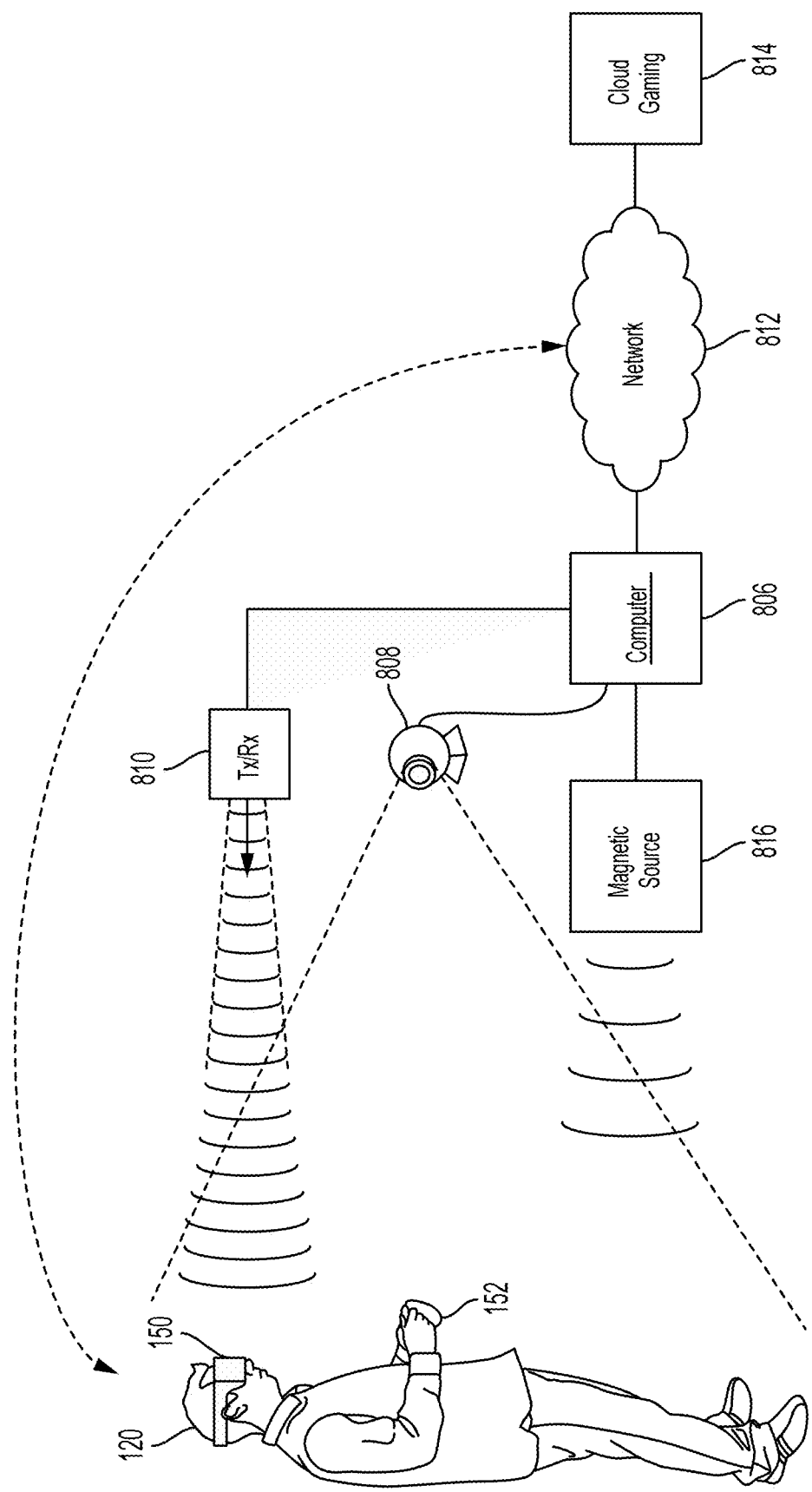
FIG. 8 illustrates a system for interaction with a virtual environment via a head-mounted display (HMD), in accordance with an implementation of the disclosure.

FIG. 8 illustrates a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD. In the illustrated implementation, a user 120 is shown wearing a head-mounted display (HMD) 150. The HMD 150 is worn in a manner similar to glasses, goggles, or a helmet, and is configured to display a video game or other content to the user 120. The HMD 150 provides a very immersive experience to the user by virtue of its provision of display mechanisms in close proximity to the user's eyes. Thus, the HMD 150 can provide display regions to each of the user's eyes which occupy large portions or even the entirety of the field of view of the user, and may also provide viewing with three-dimensional depth and perspective.

In the illustrated implementation, the HMD 150 is wirelessly connected to a computer 806. In other implementations, the HMD 150 is connected to the computer 806 through a wired connection. The computer 806 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 150. In some implementations, the computer 806 is configured to execute any other type of interactive application that provides a virtual space/environment that can be viewed through an HMD. A transceiver 810 is configured to transmit (by wired connection or wireless connection) the video and audio from the video game to the HMD 150 for rendering thereon. The transceiver 810 includes a transmitter for transmission of data to the HMD 150, as well as a receiver for receiving data that is transmitted by the HMD 150.

In some implementations, the HMD 150 may also communicate with the computer through alternative mechanisms or channels, such as via a network 812 to which both the HMD 150 and the computer 106 are connected.

The user 120 may operate an interface object 152 to provide input for the video game. Additionally, a camera 808 can be configured to capture images of the interactive environment in which the user 120 is located. These captured images can be analyzed to determine the location and movements of the user 120, the HMD 150, and the interface object 152. In various implementations, the interface object 152 includes a light which can be tracked, and/or inertial sensor(s), to enable determination of the interface object's location and orientation and tracking of movements.

In some implementations, a magnetic source 816 is provided that emits a magnetic field to enable magnetic tracking of the HMD 150 and interface object 152. Magnetic sensors in the HMD 150 and the interface object 152 can be configured to detect the magnetic field (e.g. strength, orientation), and this information can be used to determine and track the location and/or orientation of the HMD 150 and the interface object 152.

In some implementations, the interface object 152 is tracked relative to the HMD 150. For example, the HMD 150 may include an externally facing camera that captures images including the interface object 152. The captured images can be analyzed to determine the location/orientation of the interface object 152 relative to the HMD 150, and using a known location/orientation of the HMD, so determine the location/orientation of the interface object 152 in the local environment.

The way the user interfaces with the virtual reality scene displayed in the HMD 150 can vary, and other interface devices in addition to interface object 152, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 150.

Additionally, the HMD 150 may include one or more lights which can be tracked to determine the location and orientation of the HMD 150. The camera 808 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 808 can be defined to include multiple image capture devices (e.g. stereoscopic pair of cameras), an IR camera, a depth camera, and combinations thereof.

In some implementations, the computer 806 functions as a thin client in communication over a network 812 with a cloud application (e.g. gaming, streaming, spectating, etc.) provider 814. In such an implementation, generally speaking, the cloud application provider 114 maintains and executes the video game being played by the user 150. The computer 806 transmits inputs from the HMD 150, the interface object 152 and the camera 808, to the cloud application provider, which processes the inputs to affect the game state of the executing video game. The output from the executing video game, such as video data, audio data, and haptic feedback data, is transmitted to the computer 806. The computer 806 may further process the data before transmission or may directly transmit the data to the relevant devices. For example, video and audio streams are provided to the HMD 150, whereas a haptic/vibration feedback command is provided to the interface object 152.

In some implementations, the HMD 150, interface object 152, and camera 808, may themselves be networked devices that connect to the network 812, for example to communicate with the cloud application provider 814. In some implementations, the computer 106 may be a local network device, such as a router, that does not otherwise perform video game processing, but which facilitates passage of network traffic. The connections to the network by the HMD 150, interface object 152, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figures 1, 9A:
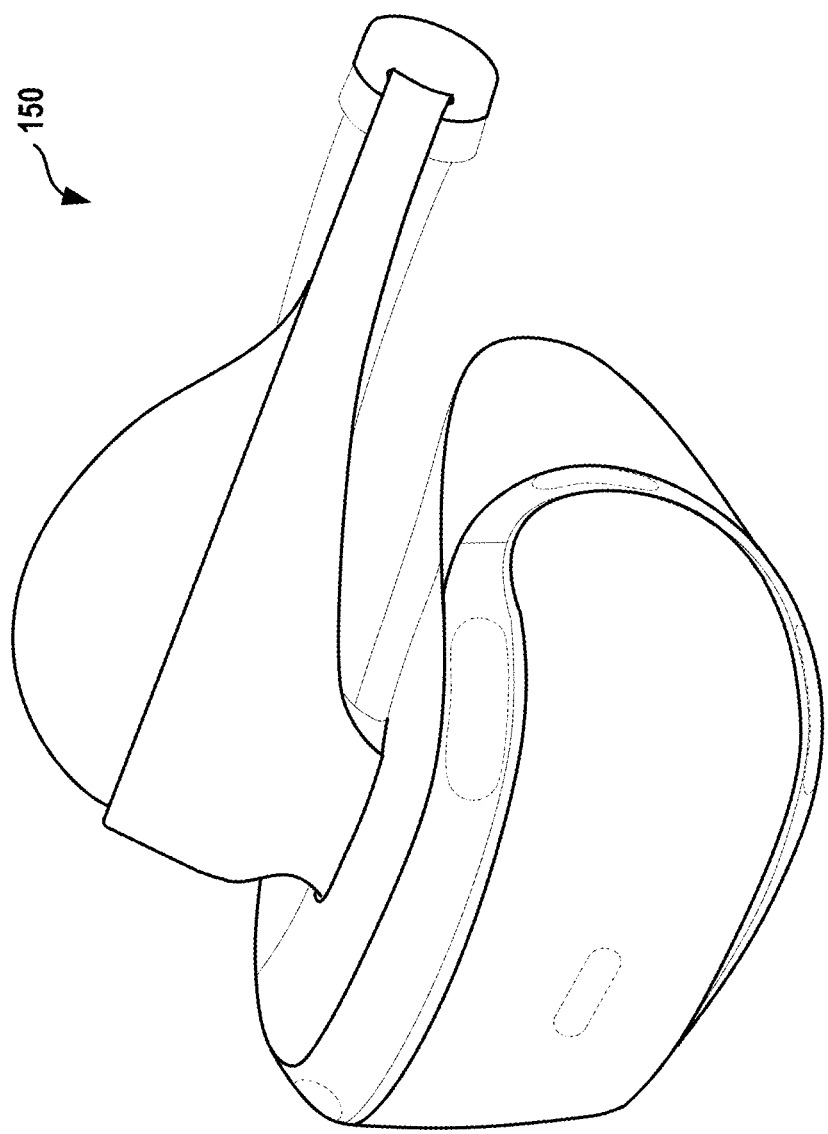
Figures 2, 9A:
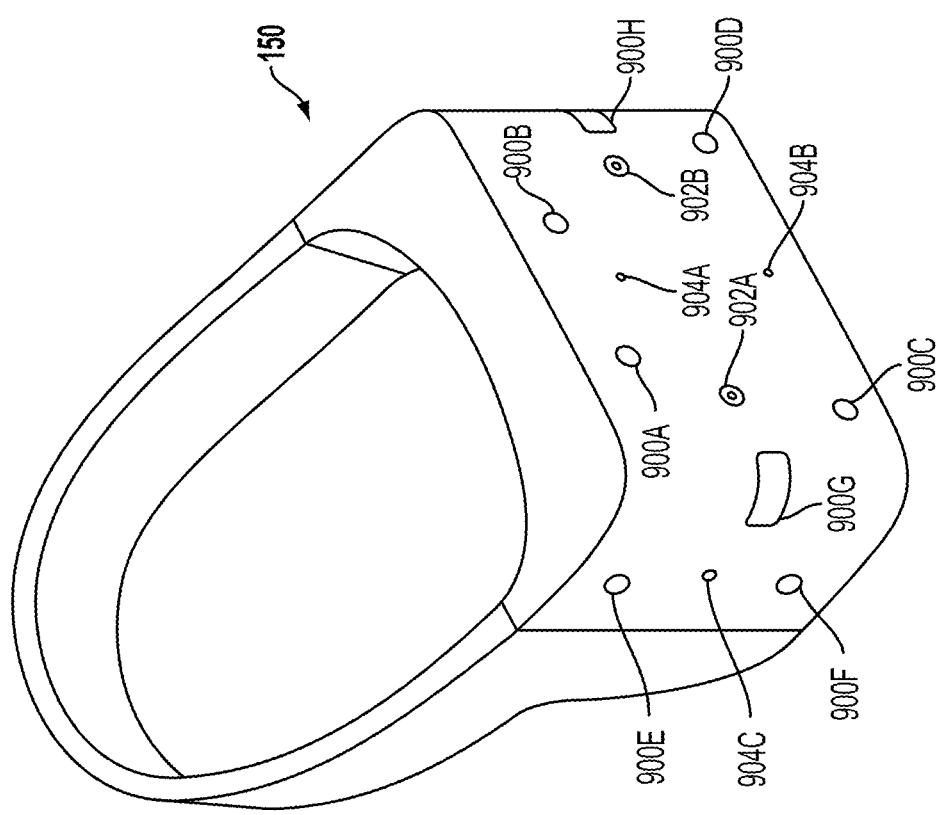

FIGS. 9A-1 and 9A-2 illustrate a head-mounted display (HMD), in accordance with an implementation of the disclosure. FIG. 9A-1 in particular illustrates the Playstation® VR headset, which is one example of a HMD in accordance with implementations of the disclosure. As shown, the HMD 150 includes a plurality of lights 900A-H. Each of these lights may be configured to have specific shapes, and can be configured to have the same or different colors. The lights 900A, 900B, 900C, and 900D are arranged on the front surface of the HMD 150. The lights 900E and 900F are arranged on a side surface of the HMD 150. And the lights 900G and 900H are arranged at corners of the HMD 150, so as to span the front surface and a side surface of the HMD 150. It will be appreciated that the lights can be identified in captured images of an interactive environment in which a user uses the HMD 150. Based on identification and tracking of the lights, the location and orientation of the HMD 150 in the interactive environment can be determined. It will further be appreciated that some of the lights may or may not be visible depending upon the particular orientation of the HMD 150 relative to an image capture device. Also, different portions of lights (e.g. lights 900G and 900H) may be exposed for image capture depending upon the orientation of the HMD 150 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 150. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 150 and understand that the user is actively engaged in intense gameplay, and may not wish to be disturbed at that moment.

The HMD 150 may additionally include one or more microphones. In the illustrated implementation, the HMD 150 includes microphones 904A and 904B defined on the front surface of the HMD 150, and microphone 904C defined on a side surface of the HMD 150. By utilizing an array of microphones, sound from each of the microphones can be processed to determine the location of the sound's source. This information can be utilized in various ways, including exclusion of unwanted sound sources, association of a sound source with a visual identification, etc.

The HMD 150 may also include one or more image capture devices. In the illustrated implementation, the HMD 150 is shown to include image capture devices 902A and 902B. By utilizing a stereoscopic pair of image capture devices, three-dimensional (3D) images and video of the environment can be captured from the perspective of the HMD 150. Such video can be presented to the user to provide the user with a "video see-through" ability while wearing the HMD 150. That is, though the user cannot see through the HMD 150 in a strict sense, the video captured by the image capture devices 902A and 902B (e.g., or one or more external facing (e.g. front facing) cameras disposed on the outside body of the HMD 150) can nonetheless provide a functional equivalent of being able to see the environment external to the HMD 150 as if looking through the HMD 150. Such video can be augmented with virtual elements to provide an augmented reality experience, or may be combined or blended with virtual elements in other ways. Though in the illustrated implementation, two cameras are shown on the front surface of the HMD 150, it will be appreciated that there may be any number of externally facing cameras installed on the HMD 150, oriented in any direction. For example, in another implementation, there may be cameras mounted on the sides of the HMD 150 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 9B:
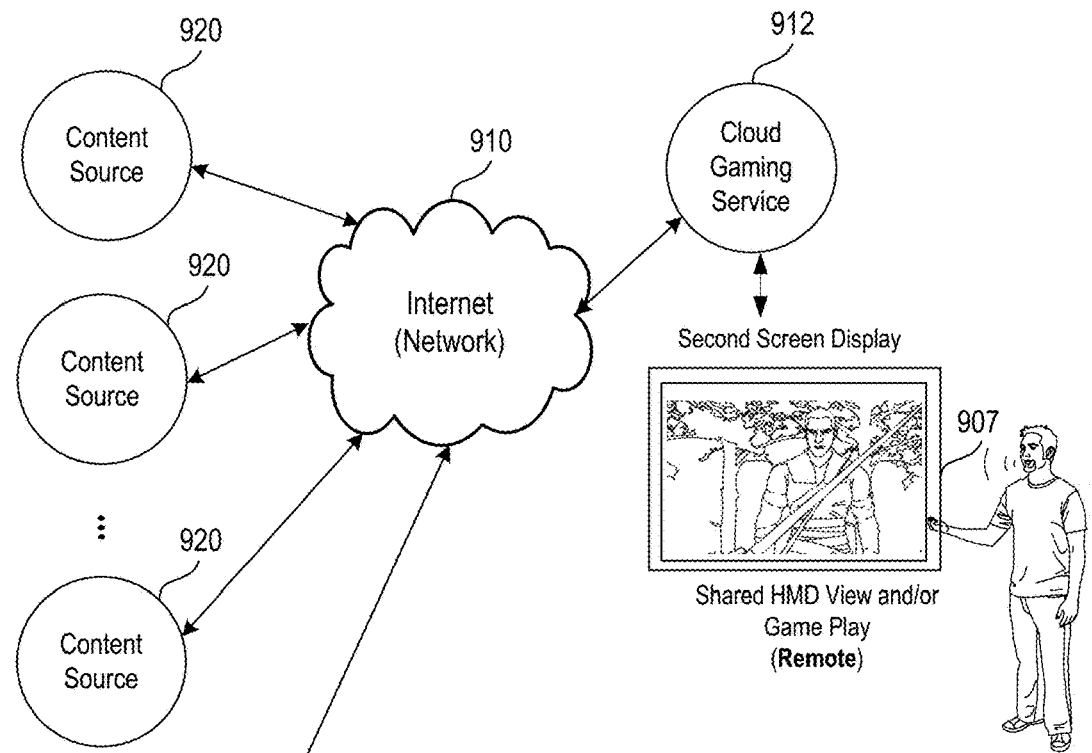
FIG. 9B illustrates one example of an HMD user interfacing with a client system, and the client system providing content to a second screen display, which is referred to as a second screen, in accordance with one implementation.
Figure 9B:
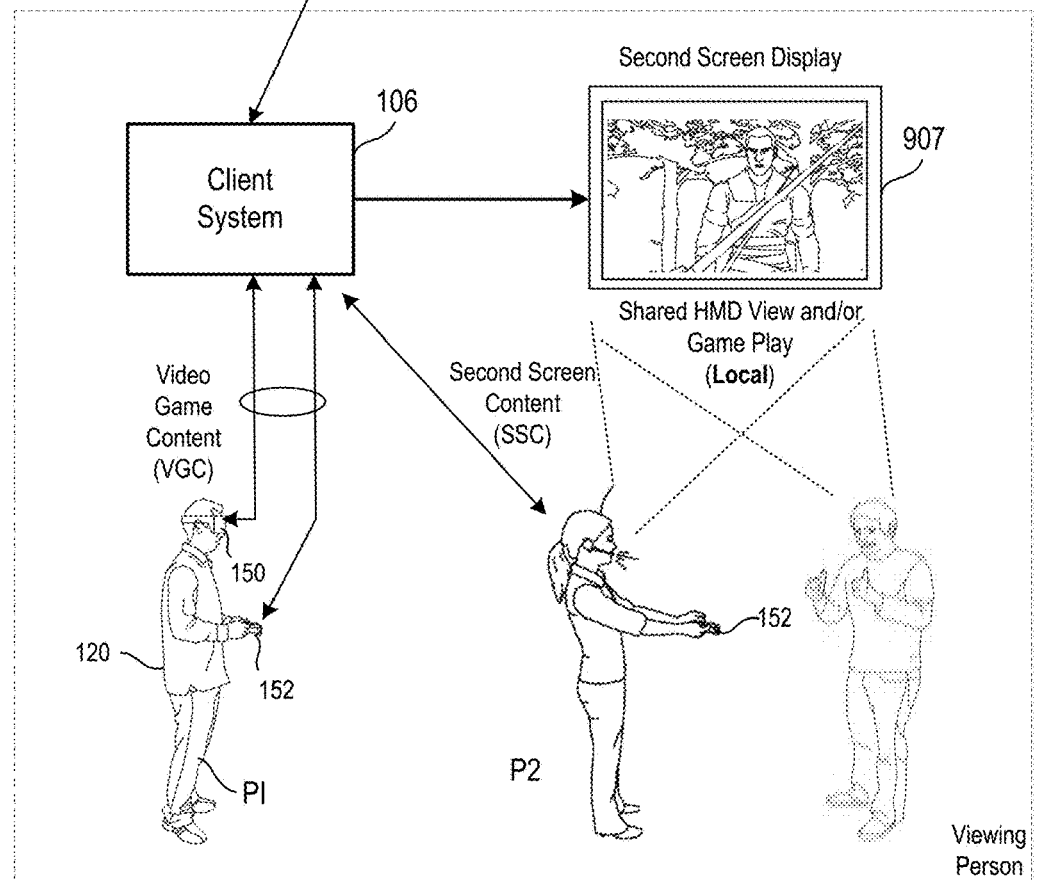

FIG. 9B illustrates one example of an HMD 150 user 120 interfacing with a client system 806, and the client system 806 providing content to a second screen display, which is referred to as a second screen 907. The client system 806 may include integrated electronics for processing the sharing of content from the HMD 150 to the second screen 907. Other implementations may include a separate device, module, connector, that will interface between the client system and each of the HMD 150 and the second screen 907. In this general example, user 120 is wearing HMD 150 and is playing a video game using a controller, which may also be interface object 104. The interactive play by user 120 will produce video game content (VGC), which is displayed interactively to the HMD 150.

In one implementation, the content being displayed in the HMD 150 is shared to the second screen 907. In one example, a person viewing the second screen 907 can view the content being played interactively in the HMD 150 by user 120. In another implementation, another user (e.g. player 2) can interact with the client system 806 to produce second screen content (SSC). The second screen content produced by a player also interacting with the controller 104 (or any type of user interface, gesture, voice, or input), may be produced as SSC to the client system 806, which can be displayed on second screen 907 along with the VGC received from the HMD 150.

Accordingly, the interactivity by other users who may be co-located or remote from an HMD user can be social, interactive, and more immersive to both the HMD user and users that may be viewing the content played by the HMD user on a second screen 907. As illustrated, the client system 806 can be connected to the Internet 910. The Internet can also provide access to the client system 806 to content from various content sources 920. The content sources 920 can include any type of content that is accessible over the Internet.

Such content, without limitation, can include video content, movie content, streaming content, social media content, news content, friend content, advertisement content, etc. In one implementation, the client system 806 can be used to simultaneously process content for an HMD user, such that the HMD is provided with multimedia content associated with the interactivity during gameplay. The client system 806 can then also provide other content, which may be unrelated to the video game content to the second screen. The client system 806 can, in one implementation receive the second screen content from one of the content sources 920, or from a local user, or a remote user.

Figure 10:
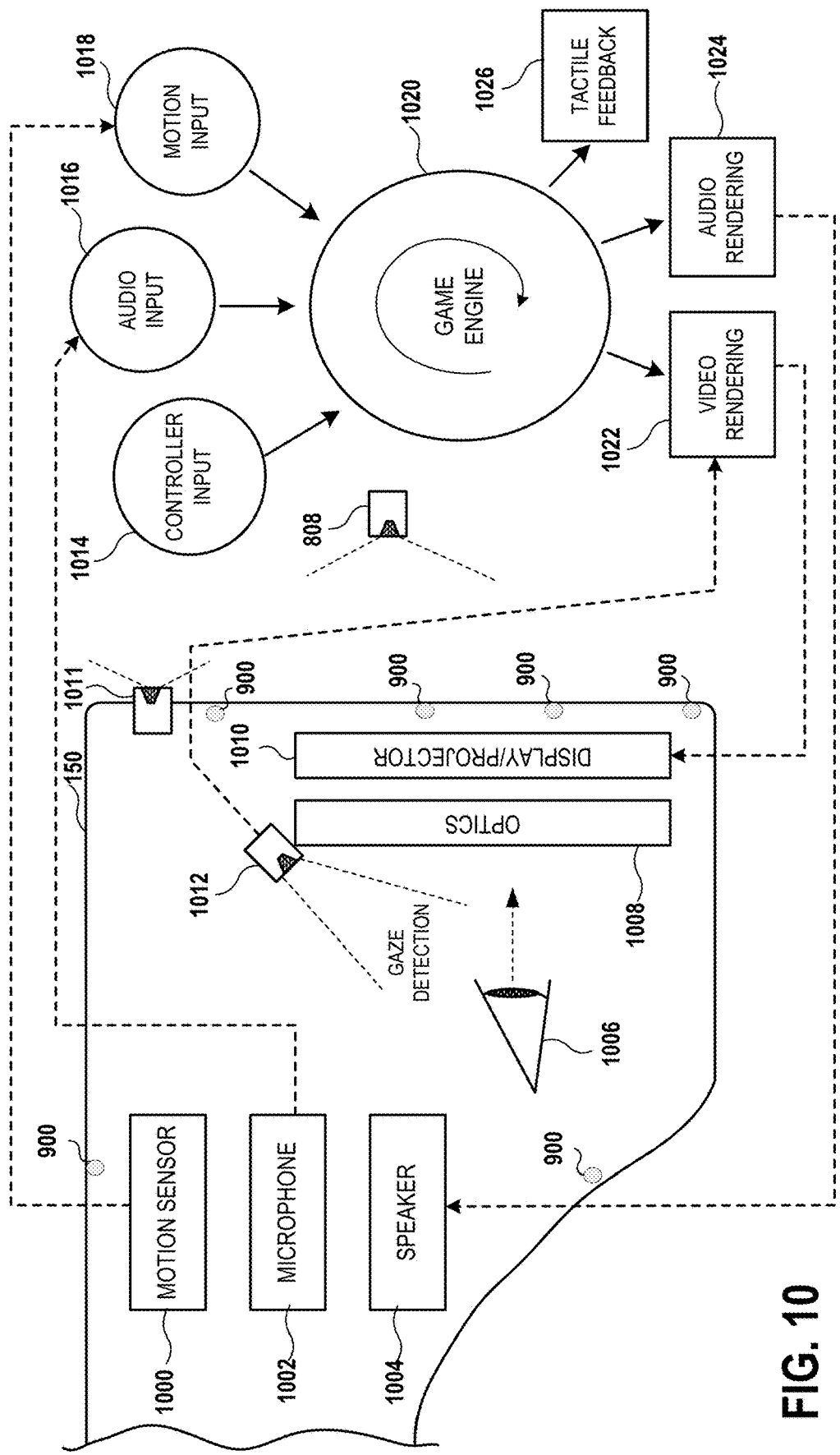
FIG. 10 conceptually illustrates the function of an HMD in conjunction with an executing video game, in accordance with an implementation of the disclosure.

FIG. 10 conceptually illustrates the function of the HMD 150 in conjunction with an executing video game or other application, in accordance with an implementation of the disclosure. The executing video game/application is defined by a game/application engine 1020 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 1014, audio input 1016 and motion input 1018. The controller input 1014 may be defined from the operation of a gaming controller separate from the HMD 150, such as a handheld gaming controller (e.g. Sony DUALSHOCK®4 wireless controller, Sony PlayStation® Move motion controller) or interface object 152. By way of example, controller input 1014 may include directional inputs, button presses, trigger activation, movements, gestures, or other kinds of inputs processed from the operation of a gaming controller. In some implementations, the movements of a gaming controller are tracked through an externally facing camera 1011 of the HMD 102, which provides the location/orientation of the gaming controller relative to the HMD 102. The audio input 1016 can be processed from a microphone 1002 of the HMD 150, or from a microphone included in the image capture device 808 or elsewhere in the local environment. The motion input 1018 can be processed from a motion sensor 1000 included in the HMD 150, or from image capture device 808 as it captures images of the HMD 150. The game engine 1020 receives inputs which are processed according to the configuration of the game engine to update the game state of the video game. The game engine 1020 outputs game state data to various rendering modules which process the game state data to define content which will be presented to the user.

In the illustrated implementation, a video rendering module 1022 is defined to render a video stream for presentation on the HMD 150. The video stream may be presented by a display/projector mechanism 1010, and viewed through optics 1008 by the eye 1006 of the user. An audio rendering module 1004 is configured to render an audio stream for listening by the user. In one implementation, the audio stream is output through a speaker 1004 associated with the HMD 150. It should be appreciated that speaker 1004 may take the form of an open air speaker, headphones, or any other kind of speaker capable of presenting audio.

In one implementation, a gaze tracking camera 1012 is included in the HMD 150 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1012, when considered alone, provides for a gaze direction of the user relative to the HMD 150. However, when considered in combination with the tracked location and orientation of the HMD 150, a real-world gaze direction of the user can be determined, as the location and orientation of the HMD 150 is synonymous with the location and orientation of the user's head. That is, the real-world gaze direction of the user can be determined from tracking the positional movements of the user's eyes and tracking the location and orientation of the HMD 150. When a view of a virtual environment is rendered on the HMD 150, the real-world gaze direction of the user can be applied to determine a virtual world gaze direction of the user in the virtual environment.

Additionally, a tactile feedback module 1026 is configured to provide signals to tactile feedback hardware included in either the HMD 150 or another device operated by the user, such as interface object 152. The tactile feedback may take the form of various kinds of tactile sensations, such as vibration feedback, temperature feedback, pressure feedback, etc. The interface object 152 can include corresponding hardware for rendering such forms of tactile feedback.

Figure 11:
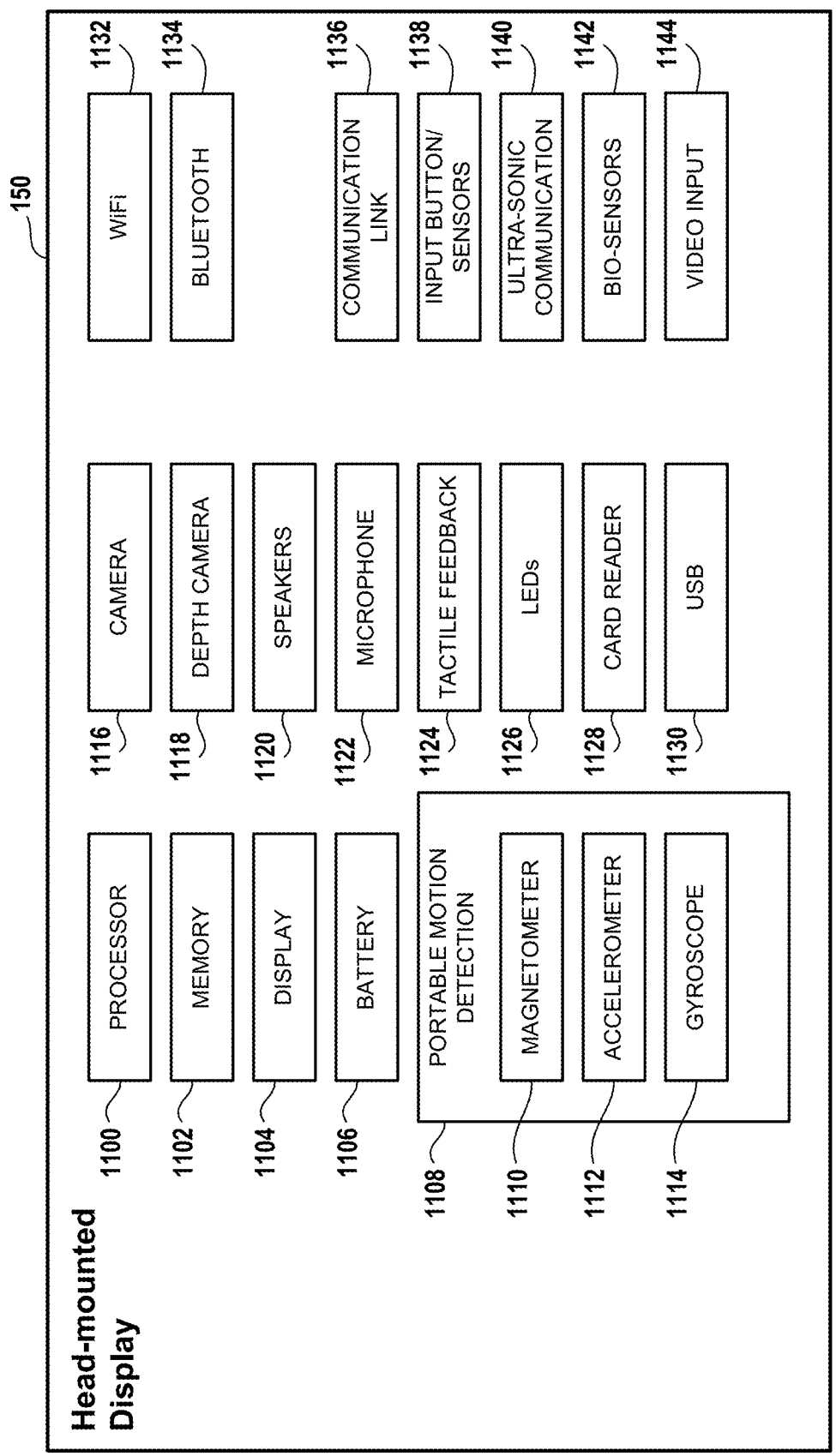
FIG. 11 illustrates components of a head-mounted display, in accordance with an implementation of the disclosure.

With reference to FIG. 11, a diagram illustrating components of a head-mounted display 150 is shown, in accordance with an implementation of the disclosure. The head-mounted display 150 includes a processor 1100 for executing program instructions. A memory 1102 is provided for storage purposes, and may include both volatile and non-volatile memory. A display 1104 is included which provides a visual interface that a user may view. A battery 1106 is provided as a power source for the head-mounted display 150. A motion detection module 1108 may include any of various kinds of motion sensitive hardware, such as a magnetometer 1110, an accelerometer 1112, and a gyroscope 1114.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1112 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1110 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1112 is used together with magnetometer 1110 to obtain the inclination and azimuth of the head-mounted display 150.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1114 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1116 is provided for capturing images and image streams of a real environment. More than one camera may be included in the head-mounted display 150, including a camera that is rear-facing (directed away from a user when the user is viewing the display of the head-mounted display 150), and a camera that is front-facing (directed towards the user when the user is viewing the display of the head-mounted display 150). Additionally, a depth camera 1118 may be included in the head-mounted display 150 for sensing depth information of objects in a real environment.

The head-mounted display 150 includes speakers 1120 for providing audio output. Also, a microphone 1122 may be included for capturing audio from the real environment, including sounds from the ambient environment, speech made by the user, etc. The head-mounted display 150 includes tactile feedback module 1124 for providing tactile feedback to the user. In one implementation, the tactile feedback module 1124 is capable of causing movement and/or vibration of the head-mounted display 150 so as to provide tactile feedback to the user.

LEDs 1126 are provided as visual indicators of statuses of the head-mounted display 150. For example, an LED may indicate battery level, power on, etc. A card reader 1128 is provided to enable the head-mounted display 150 to read and write information to and from a memory card. A USB interface 1130 is included as one example of an interface for enabling connection of peripheral devices, or connection to other devices, such as other portable devices, computers, etc. In various implementations of the head-mounted display 150, any of various kinds of interfaces may be included to enable greater connectivity of the head-mounted display 150.

A Wi-Fi module 1132 is included for enabling connection to the Internet or a local area network via wireless networking technologies. Also, the head-mounted display 150 includes a Bluetooth module 1134 for enabling wireless connection to other devices. A communications link 1136 may also be included for connection to other devices. In one implementation, the communications link 1136 utilizes infrared transmission for wireless communication. In other implementations, the communications link 1136 may utilize any of various wireless or wired transmission protocols for communication with other devices.

Input buttons/sensors 1138 are included to provide an input interface for the user. Any of various kinds of input interfaces may be included, such as buttons, touchpad, joystick, trackball, etc. An ultra-sonic communication module 1140 may be included in head-mounted display 150 for facilitating communication with other devices via ultrasonic technologies.

Bio-sensors 1142 are included to enable detection of physiological data from a user. In one implementation, the bio-sensors 1142 include one or more dry electrodes for detecting bio-electric signals of the user through the user's skin.

A video input 1144 is configured to receive a video signal from a primary processing computer (e.g. main game console) for rendering on the HMD. In some implementations, the video input is an HDMI input.

The foregoing components of head-mounted display 150 have been described as merely exemplary components that may be included in head-mounted display 150. In various implementations of the disclosure, the head-mounted display 150 may or may not include some of the various aforementioned components. Implementations of the head-mounted display 150 may additionally include other components not presently described, but known in the art, for purposes of facilitating aspects of the present disclosure as herein described.

Figure 12:
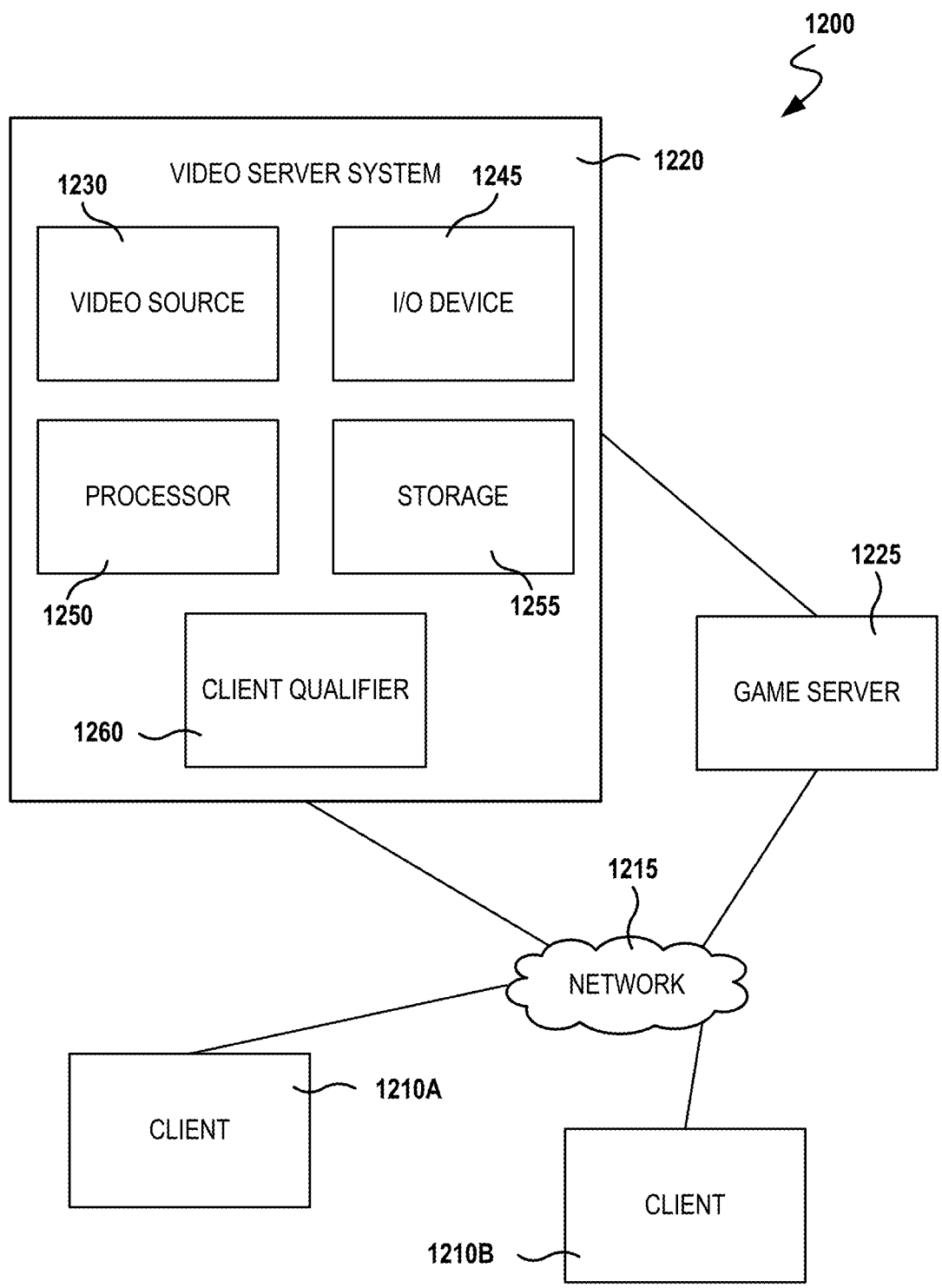
FIG. 12 is a block diagram of a Game System 1200, according to various implementations of the disclosure.

FIG. 12 is a block diagram of a Game System 1200, according to various implementations of the disclosure. Game System 1200 is configured to provide a video stream to one or more Clients 1210 via a Network 1215. Game System 1200 typically includes a Video Server System 1220 and an optional game server 1225. Video Server System 1220 is configured to provide the video stream to the one or more Clients 1210 with a minimal quality of service. For example, Video Server System 1220 may receive a game command that changes the state of or a point of view within a video game, and provide Clients 1210 with an updated video stream reflecting this change in state with minimal lag time. The Video Server System 1220 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1210, referred to herein individually as 1210A, 1210B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1210 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1210 or on a separate device such as a monitor or television. Clients 1210 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1210 are optionally geographically dispersed. The number of clients included in Game System 1200 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1220 to deliver a game viewed through the HMD. In one implementation, the game console receives the video stream from the video server system 1220, and the game console forwards the video stream, or updates to the video stream, to the HMD for rendering.

Clients 1210 are configured to receive video streams via Network 1215. Network 1215 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1210 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1210 may, but are not required to, further include systems configured for modifying received video. For example, a Client may be configured to perform further rendering, to overlay one video image on another video image, to crop a video image, and/or the like. For example, Clients 1210 may be configured to receive various types of video frames, such as I-frames, P-frames and B-frames, and to process these frames into images for display to a user. In some implementations, a member of Clients 1210 is configured to perform further rendering, shading, conversion to 3-D, or like operations on the video stream. A member of Clients 1210 is optionally configured to receive more than one audio or video stream. Input devices of Clients 1210 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1210 is generated and provided by Video Server System 1220. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1210 are typically configured to receive inputs from a user. These inputs may include game commands configured to change the state of the video game or otherwise affect game play. The game commands can be received using input devices and/or may be automatically generated by computing instructions executing on Clients 1210. The received game commands are communicated from Clients 1210 via Network 1215 to Video Server System 1220 and/or Game Server 1225. For example, in some implementations, the game commands are communicated to Game Server 1225 via Video Server System 1220. In some implementations, separate copies of the game commands are communicated from Clients 1210 to Game Server 1225 and Video Server System 1220. The communication of game commands is optionally dependent on the identity of the command Game commands are optionally communicated from Client 1210A through a different route or communication channel that that used to provide audio or video streams to Client 1210A.

Game Server 1225 is optionally operated by a different entity than Video Server System 1220. For example, Game Server 1225 may be operated by the publisher of a multiplayer game. In this example, Video Server System 1220 is optionally viewed as a client by Game Server 1225 and optionally configured to appear from the point of view of Game Server 1225 to be a prior art client executing a prior art game engine. Communication between Video Server System 1220 and Game Server 1225 optionally occurs via Network 1215. As such, Game Server 1225 can be a prior art multiplayer game server that sends game state information to multiple clients, one of which is game server system 1220. Video Server System 1220 may be configured to communicate with multiple instances of Game Server 1225 at the same time. For example, Video Server System 1220 can be configured to provide a plurality of different video games to different users. Each of these different video games may be supported by a different Game Server 1225 and/or published by different entities. In some implementations, several geographically distributed instances of Video Server System 1220 are configured to provide game video to a plurality of different users. Each of these instances of Video Server System 1220 may be in communication with the same instance of Game Server 1225. Communication between Video Server System 1220 and one or more Game Server 1225 optionally occurs via a dedicated communication channel. For example, Video Server System 1220 may be connected to Game Server 1225 via a high bandwidth channel that is dedicated to communication between these two systems.

Video Server System 1220 comprises at least a Video Source 1230, an I/O Device 1245, a Processor 1250, and non-transitory Storage 1255. Video Server System 1220 may include one computing device or be distributed among a plurality of computing devices. These computing devices are optionally connected via a communications system such as a local area network.

Video Source 1230 is configured to provide a video stream, e.g., streaming video or a series of video frames that form a moving picture. In some implementations, Video Source 1230 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1225. Game Server 1225 may maintain a copy of the state of the game based on game commands received from multiple players using geographically disperse clients. In these cases, the game state is provided by Game Server 1225 to Video Source 1230, wherein a copy of the game state is stored and rendering is performed. Game Server 1225 may receive game commands directly from Clients 1210 via Network 1215, and/or may receive game commands via Video Server System 1220.

Video Source 1230 typically includes rendering logic, e.g., hardware, firmware, and/or software stored on a computer readable medium such as Storage 1255. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1210. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1230 includes a video recording device such as a camera. This camera may be used to generate delayed or live video that can be included in the video stream of a computer game. The resulting video stream optionally includes both rendered images and images recorded using a still or video camera. Video Source 1230 may also include storage devices configured to store previously recorded video to be included in a video stream. Video Source 1230 may also include motion or positioning sensing devices configured to detect motion or position of an object, e.g., person, and logic configured to determine a game state or produce video-based on the detected motion and/or position.

Video Source 1230 is optionally configured to provide overlays configured to be placed on other video. For example, these overlays may include a command interface, log in instructions, messages to a game player, images of other game players, video feeds of other game players (e.g., webcam video). In implementations of Client 1210A including a touch screen interface or a gaze detection interface, the overlay may include a virtual keyboard, joystick, touch pad, and/or the like. In one example of an overlay a player's voice is overlaid on an audio stream. Video Source 1230 optionally further includes one or more audio sources.

In implementations wherein Video Server System 1220 is configured to maintain the game state based on input from more than one player, each player may have a different point of view comprising a position and direction of view. Video Source 1230 is optionally configured to provide a separate video stream for each player based on their point of view. Further, Video Source 1230 may be configured to provide a different frame size, frame data size, and/or encoding to each of Client 1210. Video Source 1230 is optionally configured to provide 3-D video.

I/O Device 1245 is configured for Video Server System 1220 to send and/or receive information such as video, commands, requests for information, a game state, gaze information, device motion, device location, user motion, client identities, player identities, game commands, security information, audio, and/or the like. I/O Device 1245 typically includes communication hardware such as a network card or modem. I/O Device 1245 is configured to communicate with Game Server 1225, Network 1215, and/or Clients 1210.

Processor 1250 is configured to execute logic, e.g. software, included within the various components of Video Server System 1220 discussed herein. For example, Processor 1250 may be programmed with software instructions in order to perform the functions of Video Source 1230, Game Server 1225, and/or a Client Qualifier 1260. Video Server System 1220 optionally includes more than one instance of Processor 1250. Processor 1250 may also be programmed with software instructions in order to execute commands received by Video Server System 1220, or to coordinate the operation of the various elements of Game System 1200 discussed herein. Processor 1250 may include one or more hardware device. Processor 1250 is an electronic processor.

Storage 1255 includes non-transitory analog and/or digital storage devices. For example, Storage 1255 may include an analog storage device configured to store video frames. Storage 1255 may include a computer readable digital storage, e.g. a hard drive, an optical drive, or solid state storage. Storage 1215 is configured (e.g. by way of an appropriate data structure or file system) to store video frames, artificial frames, a video stream including both video frames and artificial frames, audio frame, an audio stream, and/or the like. Storage 1255 is optionally distributed among a plurality of devices. In some implementations, Storage 1255 is configured to store the software components of Video Source 1230 discussed elsewhere herein. These components may be stored in a format ready to be provisioned when needed.

Video Server System 1220 optionally further comprises Client Qualifier 1260. Client Qualifier 1260 is configured for remotely determining the capabilities of a client, such as Clients 1210A or 1210B. These capabilities can include both the capabilities of Client 1210A itself as well as the capabilities of one or more communication channels between Client 1210A and Video Server System 1220. For example, Client Qualifier 1260 may be configured to test a communication channel through Network 1215.

Client Qualifier 1260 can determine (e.g., discover) the capabilities of Client 1210A manually or automatically. Manual determination includes communicating with a user of Client 1210A and asking the user to provide capabilities. For example, in some implementations, Client Qualifier 1260 is configured to display images, text, and/or the like within a browser of Client 1210A. In one implementation, Client 1210A is an HMD that includes a browser. In another implementation, client 1210A is a game console having a browser, which may be displayed on the HMD. The displayed objects request that the user enter information such as operating system, processor, video decoder type, type of network connection, display resolution, etc. of Client 1210A. The information entered by the user is communicated back to Client Qualifier 1260.

Automatic determination may occur, for example, by execution of an agent on Client 1210A and/or by sending test video to Client 1210A. The agent may comprise computing instructions, such as java script, embedded in a web page or installed as an add-on. The agent is optionally provided by Client Qualifier 1260. In various implementations, the agent can find out processing power of Client 1210A, decoding and display capabilities of Client 1210A, lag time reliability and bandwidth of communication channels between Client 1210A and Video Server System 1220, a display type of Client 1210A, firewalls present on Client 1210A, hardware of Client 1210A, software executing on Client 1210A, registry entries within Client 1210A, and/or the like.

Client Qualifier 1260 includes hardware, firmware, and/or software stored on a computer readable medium. Client Qualifier 1260 is optionally disposed on a computing device separate from one or more other elements of Video Server System 1220. For example, in some implementations, Client Qualifier 1260 is configured to determine the characteristics of communication channels between Clients 1210 and more than one instance of Video Server System 1220. In these implementations the information discovered by Client Qualifier can be used to determine which instance of Video Server System 1220 is best suited for delivery of streaming video to one of Clients 1210.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
   receiving, over a network from a client device, a request to spectate a live event through a head-mounted display by a virtual reality spectator;
   assigning the virtual reality spectator to a seat in a physical venue in which the live event takes place;
   during the live event, receiving a plurality of video feeds from a plurality of cameras positioned at substantially different locations from a 3D location of the seat in the physical venue;
   determining a view direction of the virtual reality spectator in the physical venue;
   accessing video processing parameters that are associated to the seat;
   using the video processing parameters and the view direction of the virtual reality spectator to select and stitch selected ones of the video feeds, from ones of the cameras positioned at substantially different locations from each other, to generate a composite video that provides a field of view of the physical venue according to the view direction from a single perspective that is defined by the 3D location of the seat in the physical venue, the selected ones of the video feeds being at least two that at least partially overlap and provide viewing from the 3D location of the seat;
   transmitting the composite video over the network to the client device for rendering to the head-mounted display, the composite video providing real-time spectating during the live event.

2. The method of claim 1, wherein the video processing parameters identify which of the video feeds are selected for stitching, the video processing parameters being defined based on the 3D location of the seat to which the video processing parameters are associated, and 3D locations of the cameras that provide the video feeds.

3. The method of claim 1, wherein assigning the virtual reality spectator to the seat includes identifying an occupancy status of seats in the physical venue, wherein the occupancy status for a given seat indicates whether the given seat is occupied by a real spectator in the physical venue, wherein the seat to which the virtual reality spectator is assigned is a seat that is not occupied by a real spectator.

4. The method of claim 3, wherein the occupancy status for the given seat further indicates whether the given seat is occupied by another virtual reality spectator, wherein the seat to which the virtual reality spectator is assigned is a seat that is not occupied by another virtual reality spectator.

5. The method of claim 1, wherein assigning the virtual reality spectator to the seat includes accessing a social graph of the virtual reality spectator, and selecting the seat based on proximity to a seat that is assigned to another virtual reality spectator that is a member of the social graph.

6. The method of claim 1, further comprising:
   accessing audio processing parameters that are stored in association with the seat;

using the audio processing parameters to generate audio data that simulates listening from a perspective that is defined by the 3D location of the seat in the physical venue;
transmitting the audio data over the network to the client device.

7. The method of claim 6, wherein the audio processing parameters identify audio captured by one or more microphones in the physical venue, from which to generate the audio data, the audio processing parameters being defined based on the 3D location of the seat to which the audio processing parameters are associated, and 3D locations of the microphones.

8. A non-transitory computer readable medium having program instructions embodied thereon that, when executed by at least one computer, cause said at least one computer to perform a method comprising the following operations:
receiving, over a network from a client device, a request to spectate a live event through a head-mounted display by a virtual reality spectator;
during the live event, assigning the virtual reality spectator to a seat in a physical venue in which the live event takes place;
receiving a plurality of video feeds from a plurality of cameras positioned at substantially different locations from a 3D location of the seat in the physical venue;
determining a view direction of the virtual reality spectator in the physical venue;
accessing video processing parameters that are associated to the seat;
using the video processing parameters and the view direction of the virtual reality spectator to select and stitch selected ones of the video feeds, from ones of the cameras positioned at substantially different locations from each other, to generate a composite video that provides a field of view of the physical venue according to the view direction from a single perspective that is defined by the 3D location of the seat in the physical venue, the selected ones of the video feeds being at least two that at least partially overlap and provide viewing from the 3D location of the seat;
transmitting the composite video over the network to the client device for rendering to the head-mounted display, the composite video providing real-time spectating during the live event.

9. The non-transitory computer readable medium of claim 8, wherein the video processing parameters identify which of the video feeds are selected for stitching, the video processing parameters being defined based on the 3D location of the seat to which the video processing parameters are associated, and 3D locations of the cameras that provide the video feeds.

10. The non-transitory computer readable medium of claim 8, wherein assigning the virtual reality spectator to the seat includes identifying an occupancy status of seats in the physical venue, wherein the occupancy status for a given seat indicates whether the given seat is occupied by a real spectator in the physical venue, wherein the seat to which the virtual reality spectator is assigned is a seat that is not occupied by a real spectator.

11. The non-transitory computer readable medium of claim 10, wherein the occupancy status for the given seat further indicates whether the given seat is occupied by another virtual reality spectator, wherein the seat to which the virtual reality spectator is assigned is a seat that is not occupied by another virtual reality spectator.

12. The non-transitory computer readable medium of claim 8, wherein assigning the virtual reality spectator to the seat includes accessing a social graph of the virtual reality spectator, and selecting the seat based on proximity to a seat that is assigned to another virtual reality spectator that is a member of the social graph.

13. The non-transitory computer readable medium of claim 8, further comprising:
accessing audio processing parameters that are stored in association with the seat;
using the audio processing parameters to generate audio data that simulates listening from a perspective that is defined by the 3D location of the seat in the physical venue;
transmitting the audio data over the network to the client device.

14. The non-transitory computer readable medium of claim 13, wherein the audio processing parameters identify audio captured by one or more microphones in the physical venue, from which to generate the audio data, the audio processing parameters being defined based on the 3D location of the seat to which the audio processing parameters are associated, and 3D locations of the microphones.

15. A system comprising at least one computing device, said at least one computing device having at least one processor and at least one memory, said at least one computing device configured to perform the following:
receiving, over a network from a client device, a request to spectate a live event through a head-mounted display by a virtual reality spectator;
assigning the virtual reality spectator to a seat in a physical venue in which the live event takes place;
during the live event, receiving a plurality of video feeds from a plurality of cameras positioned at substantially different locations from a 3D location of the seat in the physical venue;
determining a view direction of the virtual reality spectator in the physical venue;
accessing video processing parameters that are associated to the seat;
using the video processing parameters and the view direction of the virtual reality spectator to select and stitch selected ones of the video feeds, from ones of the cameras positioned at substantially different locations from each other, to generate a composite video that provides a field of view of the physical venue according to the view direction from a single perspective that is defined by the 3D location of the seat in the physical venue, the selected ones of the video feeds being at least two that at least partially overlap and provide viewing from the 3D location of the seat;
transmitting the composite video over the network to the client device for rendering to the head-mounted display, the composite video providing real-time spectating during the live event.

16. The system of claim 15, wherein the video processing parameters identify which of the video feeds are selected for stitching, the video processing parameters being defined based on the 3D location of the seat to which the video processing parameters are associated, and 3D locations of the cameras that provide the video feeds.

17. The system of claim 15, wherein assigning the virtual reality spectator to the seat includes identifying an occupancy status of seats in the physical venue, wherein the occupancy status for a given seat indicates whether the given seat is occupied by a real spectator in the physical venue, wherein the seat to which the virtual reality spectator is assigned is a seat that is not occupied by a real spectator.

18. The system of claim 17, wherein the occupancy status for the given seat further indicates whether the given seat is occupied by another virtual reality spectator, wherein the seat to which the virtual reality spectator is assigned is a seat that is not occupied by another virtual reality spectator.

19. The system of claim 15, wherein assigning the virtual reality spectator to the seat includes accessing a social graph of the virtual reality spectator, and selecting the seat based on proximity to a seat that is assigned to another virtual reality spectator that is a member of the social graph.

20. The system of claim 15, further comprising:
accessing audio processing parameters that are stored in association with the seat;
using the audio processing parameters to generate audio data that simulates listening from a perspective that is defined by the 3D location of the seat in the physical venue;
transmitting the audio data over the network to the client device.

21. The system of claim 20, wherein the audio processing parameters identify audio captured by one or more microphones in the physical venue, from which to generate the audio data, the audio processing parameters being defined based on the 3D location of the seat to which the audio processing parameters are associated, and 3D locations of the microphones.

* * * * *